United States Patent
Ishikawa et al.

(10) Patent No.: US 12,422,763 B2
(45) Date of Patent: Sep. 23, 2025

(54) FERRITE PARTICLES, ELECTROPHOTOGRAPHIC DEVELOPER CARRIER CORE MATERIAL, ELECTROPHOTOGRAPHIC DEVELOPER CARRIER, AND ELECTROPHOTOGRAPHIC DEVELOPER

(71) Applicant: POWDERTECH CO.,LTD., Kashiwa (JP)

(72) Inventors: Makoto Ishikawa, Kashiwa (JP); Tetsuya Uemura, Kashiwa (JP)

(73) Assignee: Powdertech Co., Ltd., Kashiwa (JP)

( * ) Notice: Subject to any disclaimer, the term of this patent is extended or adjusted under 35 U.S.C. 154(b) by 547 days.

(21) Appl. No.: 17/915,348

(22) PCT Filed: Mar. 17, 2021

(86) PCT No.: PCT/JP2021/010913
§ 371 (c)(1),
(2) Date: Sep. 28, 2022

(87) PCT Pub. No.: WO2021/200172
PCT Pub. Date: Oct. 7, 2021

(65) Prior Publication Data
US 2023/0144641 A1    May 11, 2023

(30) Foreign Application Priority Data
Mar. 31, 2020  (JP) ................................. 2020-062123
Apr. 6, 2020   (JP) ................................. 2020-068147

(51) Int. Cl.
G03G 9/107      (2006.01)
G03G 9/113      (2006.01)

(52) U.S. Cl.
CPC ......... G03G 9/1085 (2020.08); G03G 9/1132 (2013.01)

(58) Field of Classification Search
CPC ......... G03G 9/10; G03G 9/1085; G03G 9/113
See application file for complete search history.

(56) References Cited

U.S. PATENT DOCUMENTS

2004/0185366 A1   9/2004   Shinmura et al.
2006/0003248 A1   1/2006   Kobayashi et al.
(Continued)

FOREIGN PATENT DOCUMENTS

EP   0 351 940 A2   1/1990
EP   1 612 612 A2   1/2006
(Continued)

OTHER PUBLICATIONS

Translation of JP 2010-244026.*
(Continued)

Primary Examiner — Peter L Vajda
(74) Attorney, Agent, or Firm — Foley & Lardner LLP

(57) ABSTRACT

The present invention relates to a ferrite particle containing a crystal phase component containing a perovskite crystal represented by a compositional formula: $RZrO_3$ (provided that R represents an alkaline earth metal element), having a surface roughness Rz of 2.0 μm or more and 4.5 μm or less, and satisfying the following formulas: $6.5 \leq \log H_{1000} \leq 8.5$ and $0.80 \leq \log H_{1000}/\log H_{100} \leq 1.00$. The ferrite particle can be used as an electrophotographic developer carrier core material. In addition, an electrophotographic developer carrier and an electrophotographic developer can be obtained.

10 Claims, 1 Drawing Sheet

(56) References Cited

U.S. PATENT DOCUMENTS

| | | |
|---|---|---|
| 2011/0111337 A1 | 5/2011 | Horie et al. |
| 2019/0286000 A1* | 9/2019 | Tsurumi ............... G03G 9/1133 |
| 2022/0155701 A1 | 5/2022 | Ishikawa et al. |
| 2022/0155702 A1 | 5/2022 | Ishikawa et al. |

FOREIGN PATENT DOCUMENTS

| | | | |
|---|---|---|---|
| JP | H01-291406 A | 11/1989 | |
| JP | 2006-017828 A | 1/2006 | |
| JP | 3872025 B2 | 1/2007 | |
| JP | 2010-244026 | * 10/2010 | ............. G03G 9/113 |
| JP | 2011-118380 A | 6/2011 | |
| JP | 2019-159124 A | 9/2019 | |
| WO | WO-2020/175326 A1 | 9/2020 | |
| WO | WO-2020/175336 A1 | 9/2020 | |

OTHER PUBLICATIONS

International Searching Authority, "International Search Report," issued in connection with International Patent Application No. PCT/JP2021/010913, dated Jun. 8, 2021.

International Searching Authority, "Written Opinion," issued in connection with International Patent Application No. PCT/JP2021/010913, dated Jun. 8, 2021.

* cited by examiner

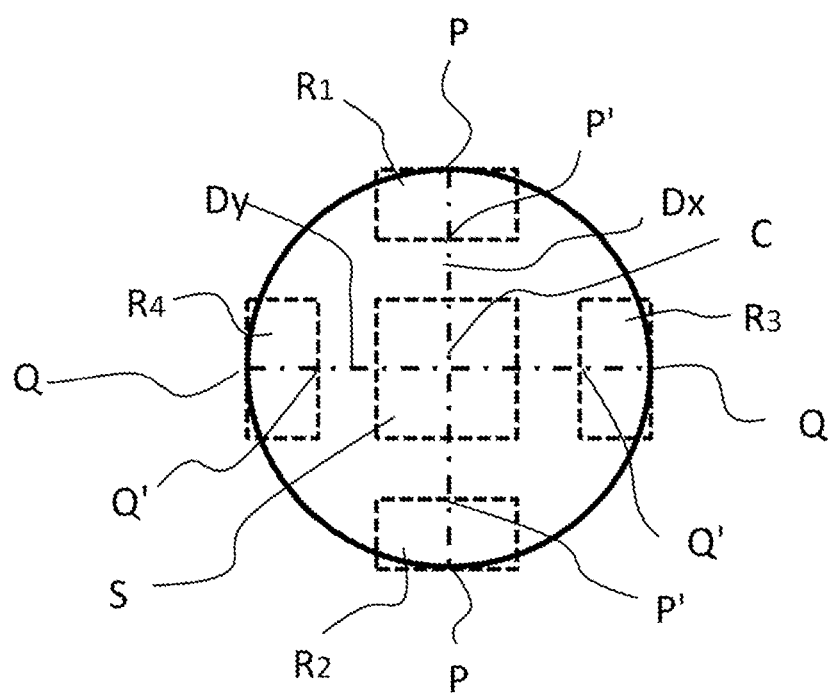

FERRITE PARTICLES, ELECTROPHOTOGRAPHIC DEVELOPER CARRIER CORE MATERIAL, ELECTROPHOTOGRAPHIC DEVELOPER CARRIER, AND ELECTROPHOTOGRAPHIC DEVELOPER

CROSS-REFERENCE TO RELATED APPLICATIONS

The present application claims priority under 37 U.S.C. § 371 to International Patent Application No. PCT/JP2021/010913, filed Mar. 17, 2021, which claims priority to and the benefit of Japanese Patent Application Nos. 2020-062123, filed on Mar. 31, 2020, and 2020-068147, filed on Apr. 6, 2020. The contents of these applications are hereby incorporated by reference in their entireties.

TECHNICAL FIELD

The present invention relates to a ferrite particle, an electrophotographic developer carrier core material, an electrophotographic developer carrier, and an electrophotographic developer.

BACKGROUND ART

An electrophotographic developing method refers to a method in which toner in a developer is caused to adhere to an electrostatic latent image formed on a photoreceptor to develop the image. Developers used for this method are classified into two-component developers that contain a toner and a carrier, and one-component developers that use only a toner. Regarding a developing method of using a two-component developer, a cascade method and the like were employed in the past; however, currently, a magnetic brush method of using a magnet roll is in the mainstream.

In the magnetic brush method, a carrier and a toner are stirred and mixed in a developing box filled with a developer to impart an electric charge to the toner. Then, the carrier is conveyed to the surface of a photoreceptor by means of a developing roll that holds a magnet. At that time, the electrically charged toner is conveyed by the carrier to the surface of the photoreceptor. After a toner image is formed by an electrostatic action on the photoreceptor, the carrier remaining on the developing roll is collected again into the developing box and stirred and mixed with a fresh toner, and thus the carrier is used repeatedly for a certain period of time.

With regard to a two-component developer, since the magnetic characteristics and electric characteristics of the carrier itself can be designed separately from the toner unlike a one-component developer, favorable controllability is obtained at the time of designing the developer. Therefore, a two-component developer is appropriate for a full-color developing apparatus where high image quality is required, an apparatus performing high-speed printing, where reliability for maintaining an image and durability are required, and the like.

In recent years, particle size reduction of the toner intended for developing electrostatic latent images with high precision is in progress. Along with the particle size reduction of the toner, particle size reduction of the carrier is also in progress. In the case where the particle size of the carrier is reduced, since the mechanical stress at the time of stirring and mixing the carrier and the toner can be relieved and the occurrence of toner spending and the like can be suppressed, the lifetime of developers have been prolongated as compared to conventional cases. Regarding the carrier, a carrier in which a resin coating layer is provided on the surface of a core material having magnetic properties, such as a ferrite particle, is generally used. In the case where a developer is used for a long period of time, the resin coating layer on the carrier surface is peeled off, and the surface of the core material may be exposed. Since the core material has a low resistance, in the case where the surface of the core material is exposed, the surface resistance of the carrier is decreased, carrier scattering caused by charge injection is likely to occur, and image defects are likely to be generated.

In order to cope with such problems, for example, various means in which ferrite particles having high resistance are used as core materials have been proposed. As a ferrite particle having such high resistance, Patent Literature 1 proposes a ferrite particle containing: a ferrite component represented by the compositional formula: $(MnO)x(MgO)y(Fe_2O_3)z$ in which the amounts of x, y, and z are in predetermined ranges; and a predetermined amount of $ZrO_2$ that is not solid-solubilized in this ferrite component. In the case where the ferrite particle described in Patent Literature 1 is used as a core material, a highly resistant carrier can be obtained, and carrier scattering can be suppressed. Furthermore, even when the resin coating layer is peeled off, since the resistance of the core material itself is high, carrier scattering caused by charge injection can be suppressed. From these effects, carrier scattering can be suppressed over a long period of time, and image defects associated with carrier scattering can be suppressed.

CITATION LIST

Patent Literature

Patent Literature 1: Japanese Patent No. 3872025

SUMMARY OF INVENTION

Technical Problem

However, in a carrier in which the conventional ferrite particle described above is used as a core material, the resistance value tends to be low in a high-temperature and high-humidity environment, and therefore, it is difficult to sufficiently suppress carrier scattering in a high-temperature and high-humidity environment. In addition, leakage of a countercharge is less likely to occur after development, and there is a problem that a satisfactory image density is not obtained particularly during high-speed image printing or during high-printing density printing.

Thus, an object of the present invention is to provide a ferrite particle that can suppress the occurrence of carrier scattering in a high-temperature and high-humidity environment and has satisfactory developability, an electrophotographic developer carrier core material, an electrophotographic developer carrier, and an electrophotographic developer.

Solution to Problem

In order to solve the above-described problems, a ferrite particle according to the present invention contains a crystal phase component containing a perovskite crystal represented by a compositional formula: $RZrO_3$ (provided that R represents an alkaline earth metal element), has a surface roughness Rz of 2.0 μm or more and 4.5 μm or less, and satisfies the following formulas:

$$6.5 \leq \log H_{1000} \leq 8.5, \text{ and}$$

$$0.80 \leq \log H_{1000}/\log H_{100} \leq 1.00,$$

where $\log H_{1000}$: logarithmic value ($\log \Omega$) of a resistance value $H_{1000}$ ($\Omega$) of the ferrite particle when an applied voltage of 1,000 V is applied at a distance between electrodes of 2 mm in a high-temperature and high-humidity environment (30° C., relative humidity of 80%), $\log H_{100}$: logarithmic value ($\log \Omega$) of a resistance value $H_{100}$ ($\Omega$) of the ferrite particle when an applied voltage of 100 V is applied at a distance between electrodes of 2 mm in the high-temperature and high-humidity environment (30° C., relative humidity of 80%).

The ferrite particle according to the present invention preferably has the surface roughness Rz of 2.5 μm or more and 4.2 μm or less.

The ferrite particle according to the present invention preferably satisfies the following formulas:

$$6.7 \leq \log H_{1000} \leq 8.2, \text{ and}$$

$$0.85 \leq \log H_{1000}/\log H_{100} \leq 1.00.$$

With regard to the ferrite particle according to the present invention, the R is preferably at least one element selected from the group consisting of Sr, Ca, and Ba.

The ferrite particle according to the present invention preferably contains the crystal phase component containing the perovskite crystal in an amount of 0.05% by mass or more and 4.00% by mass or less when a phase composition analysis of a crystal phase constituting the ferrite particle is performed by a Rietveld analysis of an X-ray diffraction pattern.

The ferrite particle according to the present invention is preferably a spinel ferrite particle containing a crystal phase component containing a spinel crystal represented by a compositional formula: $(MnO)x(MgO)y(Fe_2O_3)z$ (provided that $15 \leq x \leq 50$, $2 \leq y \leq 35$, $45 \leq z \leq 60$, $x+y+z=100$ (mol %)) as a main composition.

In order to solve the above-described problem, an electrophotographic developer carrier core material according to the present invention includes the above-described ferrite particle.

In order to solve the above-described problem, an electrophotographic developer carrier according to the present invention includes the above-described ferrite particle and a resin coating layer provided on the surface of the ferrite particle.

In order to solve the above-described problem, an electrophotographic developer according to the present invention includes the above-described electrophotographic developer carrier and a toner.

The electrophotographic developer according to the present invention may be used as a replenishment developer.

Advantageous Effects of Invention

According to the present invention, a ferrite particle that can suppress the occurrence of carrier scattering in a high-temperature and high-humidity environment and has satisfactory developability, an electrophotographic developer carrier core material, an electrophotographic developer carrier, and an electrophotographic developer can be provided.

BRIEF DESCRIPTION OF DRAWINGS

[FIGURE] This is a diagram schematically illustrating a cross-section of a ferrite particle and is a diagram for describing a method for determining the dispersion degree of Zr in the ferrite particle.

DESCRIPTION OF EMBODIMENTS

Hereinafter, embodiments of the ferrite particle, the electrophotographic developer carrier core material, the electrophotographic developer carrier, and the electrophotographic developer according to the present invention will be described. Incidentally, according to the present specification, unless particularly stated otherwise, the ferrite particle, the electrophotographic developer carrier core material, the electrophotographic developer carrier, and the electrophotographic developer each mean an aggregate of particles, that is, a powder. First, embodiments of the ferrite particle will be described. Furthermore, in the following description, the ferrite particle according to the present invention will be mainly described as particles that are used as an electrophotographic developer carrier core material. However, the ferrite particle according to the present invention can be used for various use applications, including various functional fillers such as a magnetic ink, a magnetic fluid, a magnetic filler, a filler for bond magnet, and a filler for an electromagnetic wave shielding material, and electronic component materials, and the like, and the use application of the ferrite particle is not limited to the electrophotographic developer carrier core material.

1. Ferrite Particle and Electrophotographic Developer Carrier Core Material

First, embodiments of the ferrite particle according to the present invention will be described. The ferrite particle according to the present invention contains a crystal phase component containing a perovskite crystal represented by the compositional formula: $RZrO_3$ (provided that R represents an alkaline earth metal element), has a surface roughness Rz falling within a predetermined range, and has a resistance satisfying predetermined conditions.

1-1. Crystal Phase Component Containing a Perovskite Crystal, Surface Characteristics, and Resistance Value (1) Crystal Phase Component Containing a Perovskite Crystal First, the crystal phase component containing a perovskite crystal represented by the compositional formula: $RZrO_3$ (provided that R represents an alkaline earth metal element) will be described.

As a two-component-based electrophotographic developer carrier suitable for a magnetic brush method, a resin-coated carrier in which a magnetic particle is used as a core material and the surface thereof is coated with a resin has been used. As the magnetic particle that is used as the core material, a ferrite particle that is a magnetic oxide containing ferric oxide ($Fe_2O_3$) as a main component is mainly used. In order to suppress carrier scattering, it is required to use a ferrite particle with a high magnetization and high resistance as the core material.

In recent years, a multi-element ferrite particle containing a metal element such as Mg, Mn, Sr, and Ca in addition to Fe has been widely used as the core material. When a ferrite is produced, metal oxides, metal hydroxides and the like which include metal elements of the intended composition are used as raw materials. In order to obtain a highly magnetized ferrite particle, it is required that a ferritization reaction of raw materials is caused to proceed sufficiently, and unreacted raw materials that do not exhibit magnetism (hereinafter, referred to as "unreacted raw materials") are prevented from remaining in the ferrite particle. However, in the case of the multi-element ferrite, since the formation temperature and formation rate of the ferrite vary depending on the combination of elements, and ferrite reactions proceed only on the contact surfaces between raw materials, it is difficult to completely ferritize the raw materials under general sintering conditions. Therefore, unreacted raw materials remain in the ferrite particle.

Furthermore, the raw materials of a ferrite include metals or metal compounds that are not involved in ferrite reactions, such as Na and K, as unavoidable impurities. These unavoidable impurities do not exhibit magnetism. Therefore, in order to obtain a highly magnetized ferrite particle, it is necessary to reduce the quantity of unavoidable impurities. However, no matter how high the purity of the raw materials used is, a very small quantity of unavoidable impurities is present in the raw materials, and it is not realistic to completely eliminate unavoidable impurities.

In addition, in the case where there are defects in the textural structure of the ferrite particle, magnetization of the ferrite particle is decreased. Examples of a structural defect that causes a decrease in magnetization include defects in the ferrite particle (e.g., lattice defects). In the case of a multi-element ferrite, since the ferrite reaction becomes complicated as compared to a single-component ferrite, structural defects are likely to occur.

On the other hand, since a ferrite particle contains metal oxides, the ferrite particle generally has a high resistance. However, when moisture adheres to the surface, resistance is decreased. Furthermore, unavoidable impurities including alkali metals such as Na and K, which are included in the raw materials, are easily ionized by the presence of moisture in the atmosphere. Therefore, when the quantity of unavoidable impurities in the ferrite particles increases, the resistance of the ferrite particles is lowered. Furthermore, in the case where the quantity of unavoidable impurities increases, the resistance is likely to fluctuate according to the change in ambient humidity.

In view of these matters, in order to obtain a ferrite particle having a high resistance and low environmental dependency of resistance, the quantity of unavoidable impurities in the ferrite particles needs to be reduced. However, as described above, it is not realistic to completely eliminate unavoidable impurities. Incidentally, since the unreacted raw materials (except for unavoidable impurities) are metal oxides, inclusion of unreacted raw materials is not a cause of the lowering of resistance of the ferrite particle.

Meanwhile, a ferrite particle is often a polycrystalline body, which is an aggregate of single crystals. Even if the composition of the ferrite particle is the same, the magnetic characteristics and electrical characteristics of the ferrite particle vary depending on the textural structure of the ferrite particle. Thus, the inventors of the present invention paid attention to the textural structure of the ferrite particle and found that in order to obtain a ferrite having a high magnetization and high resistance and having low environmental dependency of resistance, it is important to include a crystal phase component containing a perovskite crystal represented by the compositional formula: $RZrO_3$ (provided that R represents an alkaline earth metal element), thus finally conceiving the present invention.

The reason why the above-described problems can be solved by including a crystal phase component containing a perovskite crystal represented by the compositional formula: $RZrO_3$ (provided that R represents an alkaline earth metal element) is not clearly understood; however, the present inventors speculate the reason as follows.

At the grain boundaries of a ferrite particle, there are components that do not form a solid solution with ferrite, such as unreacted raw materials and unavoidable impurities. Furthermore, these components that have been squeezed out to the grain boundaries concomitantly with the growth of crystal grains are also present on the surface of the ferrite particle. In the case where the crystal grains constituting the ferrite particle are large, the grain boundaries are continuously formed inside the ferrite particle like a flow channel connecting one point with another point on the surface of the ferrite particle. The unavoidable impurities present at the surface or grain boundaries of the ferrite particle are easily ionized. Therefore, in the case where unavoidable impurities such as Na are continuously distributed at the grain boundaries that are continuously formed in the ferrite particle, when moisture adheres to the surface of the ferrite particle, the grain boundaries become like conduction paths, and the resistance of the ferrite particle is decreased. Furthermore, it is also speculated that in a ferrite particle having such a structure, the variation of resistance also increases due to a change in the ambient humidity. Furthermore, as described above, it is difficult to completely eliminate unreacted raw materials and unavoidable impurities in the ferrite particle.

On the other hand, since a crystal phase component containing a perovskite crystal represented by the compositional formula: $RZrO_3$ (provided that R represents an alkaline earth metal element) does not form a solid solution with ferrite, this crystal phase component is dispersed at the grain boundaries of the ferrite particle. Therefore, in the ferrite particle including this crystal phase component, the grain boundary volume in the ferrite particle increases relatively as compared to a case where this crystal phase component is not included. In the case where the quantity of unavoidable impurities included in the ferrite particle is the same, when the grain boundary volume of the ferrite particle increases relatively, the distribution density of unavoidable impurities at the grain boundaries decreases relatively. At the grain boundaries, this crystal phase component, which is an insulating substance, is present in addition to the unavoidable impurities. In the ferrite particle according to the present invention, since grain boundaries are complicatedly distributed in the particle, and also, insulating substances such as unavoidable impurities and the crystal phase component are distributed discontinuously inside the grain boundaries, the grain boundaries can be suppressed from functioning like conduction paths. Therefore, it is speculated that the environmental dependency of resistance can be reduced by the ferrite particle according to the present invention.

Furthermore, in the case where the grain boundary volume in the ferrite particle is relatively small, unavoidable impurities are squeezed out at the grain boundaries to the surface, and as a result, the quantity of unavoidable impurities present on the ferrite particle surface becomes relatively large. On the other hand, in the case where the grain boundary volume in the ferrite particle is relatively large, the quantity of unavoidable impurities present on the surface of the ferrite particle can be relatively reduced. Therefore, the resistance of the ferrite particle can be increased, and the environmental dependency of resistance caused by the unavoidable impurities on the ferrite particle surface can be reduced. Furthermore, in the case of a conventional ferrite particle, since the resistance is lowered when the ambient humidity is increased, carrier scattering caused by charge injection is likely to occur in a carrier that uses the conventional ferrite particle as a core material. On the other hand, in the ferrite particle, since high resistance can be maintained even in the case where the ambient humidity is high, carrier scattering caused by charge injection can be suppressed.

In addition, the crystal phase component containing a perovskite crystal represented by the compositional formula: $RZrO_3$ (provided that R represents an alkaline earth metal element) has high insulating properties, and as the crystal phase component is present at the grain boundaries or particle surface, increase of the resistance of the ferrite particle can be promoted. In addition, in order to obtain ferrite particle containing the crystal phase component, a compound containing Zr (e.g., $ZrO_2$) is used as a raw material. For example, in the case where a multi-element ferrite has a composition including R, since a raw material containing R and a compound containing Zr undergo a solid-phase reaction, the content of the unreacted raw materials in the ferrite particle can be reduced. Therefore, the occurrence of structural defects can be suppressed, and a ferrite particle that is relatively highly magnetized can be obtained.

Here, with regard to the ferrite particle, inclusion of a crystal phase component containing a perovskite crystal represented by the compositional formula: —$RZrO_3$ (provided that R represents an alkaline earth metal element) implies that the crystal phase component is included at least in the inner part of the ferrite particle, and it is preferable that dispersion of the crystal phase component in the inner part of the ferrite particle is satisfactory, while it is more preferable that the crystal phase component is uniformly dispersed at the surface and in the inner part of the ferrite particle. Here, when the dispersion degree of Zr element in the ferrite particle that will be described below is used as an index to indicate that the crystal phase component is uniformly dispersed at the surface and in the inner part of the ferrite particle, the dispersion degree of Zr element is preferably 1.1 or less and 1.0 or greater. A preferable composition of the ferrite particle will be described later.

(2) Surface Characteristics (Surface Roughness Rz)

Next, the surface characteristics of the ferrite particle will be described. The ferrite particle has a surface roughness Rz of the particle being 2.0 μm or more and 4.5 μm or less. The present inventors have conducted a thorough investigation, and as a result, with regard to the ferrite particle, they can control the surface roughness Rz of the ferrite particle to be in the above-described range by controlling the production conditions such as the addition amounts of zirconium dioxide and the alkaline earth metal element, the sintering temperature, and the atmosphere oxygen concentration during sintering. At the same time, they can realize satisfactory developability by causing protruding parts of the ferrite particle to function as leak points particularly in a low-temperature and low-humidity environment, while satisfactorily suppressing carrier scattering particularly in a high-temperature and high-humidity environment, by controlling the resistance to be in the range to be described later. Hereinafter, this will be specifically described.

Generally, in the case where a magnetic particle such as a ferrite particle is used as a core material and a resin coating layer is provided on the surface thereof to obtain an electrophotographic developer carrier, if the resistance value of the core material is low, when the resin coating layer is peeled off and the core material is exposed, the resistance of the carrier is decreased so that carrier scattering caused by charge injection is likely to occur. On the other hand, in the case where the resistance value of the core material is high, leakage of a countercharge is less likely to occur after development, and it is difficult to develop a subsequent image satisfactorily. That is, developability is deteriorated.

In the past, in order to suppress carrier scattering and to maintain satisfactory developability at the same time, the resistance of the core material surface was increased by using a ferrite particle that had been subjected to a surface oxidation treatment as the core material. However, it is difficult to uniformly oxidize the surface of the ferrite particle. Therefore, on the surface of the ferrite particle, portions that had not been sufficiently oxidized and exhibited a low resistance value and portions in which oxidation of the surface had proceeded and the resistance became too high respectively existed locally, and the effect was limitative.

Furthermore, such a measure has been taken that the overall surface resistance of the carrier is maintained high by adding conductive microparticles such as carbon black to the resin coating layer while increasing the resistance of the core material surface and at the same time, the countercharge is rapidly leaked after development by the conductive microparticles, thereby achieving suppression of carrier scattering and maintenance of satisfactory developability at the same time. However, since carbon black is black in color, in the case where carbon black falls off from the resin coating layer when subjected to mechanical stress, printing may be achieved in a state in which carbon black is mixed into the toner, and this causes color turbidity. Therefore, it is preferable to obtain desired leak properties without adding conductive microparticles such as carbon black or by a smaller amount of addition than conventional amount.

Then, the present inventors found that by controlling the surface unevenness on the ferrite particle surface, the resistance of the carrier surface can be increased, carrier scattering can be suppressed since portions with low resistance are distributed on the carrier surface, and the countercharge can be rapidly leaked after development. They conceived the present invention based thereon. This is due to the following reason. In the case where a surface unevenness is provided on the surface of the ferrite particle, when the ferrite particle is used as a core material and a resin coating layer is provided on the surface of the ferrite particle, the thickness of the resin coating layer becomes relatively thin at the protruding parts as compared with depressed parts. Since the ferrite particle according to the present invention has a high resistance value even in a high-humidity environment, portions with low resistance, which are attributed to protruding parts of the ferrite particle, can be approximately uniformly distributed on the carrier surface while maintaining the overall surface resistance of the carrier high when the ferrite particle is produced into a carrier, by controlling the surface unevenness. As a result, while the carrier scattering particularly in a high-humidity environment can be satisfactorily suppressed, developability can be maintained by rapidly leaking the countercharge after development.

The surface roughness Rz of the ferrite particle is set to 2.0 μm or more and 4.5 μm or less. Here, the surface roughness Rz is more preferably 2.5 μm or more, and the surface roughness Rz is more preferably 4.0 μm or less. In the case where the surface roughness Rz of the ferrite particle is within these ranges, since the surface roughness of the ferrite particle is in an appropriate range, when a resin coating layer is provided to obtain a carrier, the portions of protruding parts of the ferrite particle become leak points, and the developability particularly in a low-humidity environment can be improved.

(3) Resistance Value

The ferrite particle shall have the surface roughness Rz in the above-described ranges while the resistance value thereof satisfies the following formulas.

$$6.5 \leq \log H_{1000} \leq 8.5 \quad (1)$$

$$0.80 \leq \log H_{1000}/\log H_{100} \leq 1.00 \quad (2)$$

log $H_{1000}$: logarithmic value (log $\Omega$) of a resistance value $H_{1000}$ ($\Omega$) of the ferrite particle when an applied voltage of 1,000 V is applied at a distance between electrodes of 2 mm in a high-temperature and high-humidity environment (30° C., relative humidity 80%), log $H_{100}$: logarithmic value (log $\Omega$) of a resistance value $H_{100}$ ($\Omega$) of the ferrite particle when an applied voltage of 100 V is applied at a distance between electrodes of 2 mm in a high-temperature and high-humidity environment (30° C., relative humidity 80%).

In the case where the logarithmic value of the resistance value ($H_{1000}$) of the ferrite particle in a high-temperature and high-humidity environment has a value in the numerical value range represented by Formula (1), since the ferrite particle has high resistance even in a high-temperature and high-humidity environment, the carrier scattering caused by charge injection can be suppressed. Furthermore, when a resin coating layer is provided on the surface of the ferrite particle to produce a carrier, developability can be maintained by utilizing protruding parts as leak points.

In order to obtain the above-described effect, the lower limit value of the Formula (1) is preferably 6.7, and the upper limit value is preferably 8.2.

Furthermore, in the case where the ferrite particle satisfies the relationship represented by Formula (2), since the resistance value of the ferrite particle has low electric field-dependency, even when the developing electric field varies due to the developing apparatus or the like, developability can be maintained while suppressing carrier scattering.

In order to obtain the above-described effect, the low limit value of the Formula (2) is preferably 0.85.

In addition, with regard to the ferrite particle, the logarithmic value log H of the resistance value $H_{1000}$ ($\Omega$) in a high-temperature and high-humidity environment (30° C., relative humidity 80%) when measurement is made at a distance between electrodes of 2 mm and an applied voltage of 1,000 V, is preferably 6.5 or more and 8.5 or less.

Since a ferrite particle exhibiting such a resistance value $H_{1000}$ in a high-temperature and high-humidity environment has high resistance even in the high-temperature and high-humidity environment, carrier scattering caused by charge injection is easily suppressed.

1-2. Constituent Element, Composition, and the Like 1-2-1. Constituent Element

Next, preferred embodiments in regard with the constituent elements, composition, and the like of the ferrite particle according to the present invention will be described. First, items related to a crystal phase component containing a perovskite crystal having the compositional formula: $RZrO_3$ will be described.

(1) Content Proportion of Zirconium

The ferrite particle preferably contains 0.1 mol % or more and 3.0 mol % or less of zirconium. In the case where the ferrite particle contains zirconium in this range, the content proportion of the crystal phase component containing the perovskite crystal represented by the compositional formula: $RZrO_3$ is approximately in the above-described range, and a ferrite particle having high magnetization and high resistance and having low environmental dependency of resistance can be obtained. The content proportion of zirconium in the ferrite particle is more preferably 1.0 mol % or less, and even more preferably 0.5 mol % or less.

(2) Content Proportion of R (Alkaline Earth Metal Element)

According to the present invention, R is at least one element selected from the group consisting of Ca, Sr, Ba, and Ra, that is, an alkaline earth metal element. Alkaline earth metal elements have sufficiently larger ionic radii than zirconium and form zirconate perovskite compounds having a perovskite crystal structure. In the present invention, R is more preferably at least one element selected from the group consisting of Sr, Ca, and Ba. These elements undergo a solid-phase reaction with zirconium under predetermined temperature conditions and form the zirconate perovskite compounds. Therefore, the ferrite particle according to the present invention can be obtained by controlling the sintering temperature in a production process for the ferrite particle to be in a predetermined temperature range.

The content proportion of the alkaline earth metal element (R) is more preferably 0.1 mol % or more and 3.0 mol % or less. In the case where the alkaline earth metal element (R) is contained in this range, the content proportion of the crystal phase component containing a perovskite crystal represented by the compositional formula: $RZrO_3$ is approximately in the above-described range, and a ferrite particle having high magnetization and high resistance and having low environmental dependency of resistance can be obtained. The content proportion of the alkaline earth metal element (R) in the ferrite particle is more preferably 1.0 mol % or less, and even more preferably 1.5 mol % or less.

An alkaline earth metal element undergoes a solid-phase reaction with iron and also forms a ferrite having a magnetoplumbite crystal structure or a precursor thereof. In the case of containing an alkaline earth metal element in the above-described range, the ferrite particle contains various components having different crystal structures, such as a ferrite having a magnetoplumbite crystal structure, as accessory components, together with zirconium dioxide attributable to the raw materials of zirconium and zirconate perovskite compounds. For example, in the case where a crystal phase having another crystal structure such as a spinel crystal structure is included as a main component, when accessory components having crystal structures different from those of these main components are present in the inner part of the particle, the main components grow in the direction of the particle surface in which the particle grows relatively easily, and the surface unevenness on the particle surface becomes in an appropriate state. Furthermore, by causing these accessory components to be uniformly contained in the inner part of the particle, the surface unevenness of the particle surface can be controlled to be in a uniform state, and the surface roughness Rz can be adjusted to be in the above-described range.

(3) Content Proportions of Alkaline Earth Metal Element and Zirconium

In addition, the total amount of the alkaline earth metal element and zirconium is preferably 0.2 mol % or more and 1.5 mol % or less. In the case where both elements are contained in such a range, the surface roughness Rz and resistance of the ferrite particle can be more easily set to be in the ranges of the present invention.

(4) Content Proportion of Crystal Phase Component

When a phase composition analysis of the crystal phase constituting the ferrite particle is carried out by a Rietveld analysis of an X-ray diffraction pattern, it is preferable that the crystal phase component containing the perovskite crystal represented by the compositional formula: $RZrO_3$ is contained in a range of 0.05% by mass or more and 4.00% by mass or less.

In the case where the content proportion of the crystal phase component containing the perovskite crystal represented by the compositional formula: $RZrO_3$ is in the above-described range, it is easy to uniformly disperse the crystal phase component in the inner part of the ferrite particle, and a ferrite particle having high magnetization and high resistance and having more satisfactory environmental dependency of resistance can be obtained.

In order to obtain these effects, the ferrite particle preferably contains 0.10% by mass or more, more preferably 0.15% by mass or more, and even more preferably 0.20% by mass or more, of the crystal phase component. Furthermore, the ferrite particle may contain 3.50% by mass or less or may contain 3.00% by mass or less of the crystal phase component, and even with a content of 1.50% by mass or less, the effect of the present invention can be obtained.

1-2-2. Composition (Composition of Main Component)

Regarding the ferrite particles, the composition thereof is not particularly limited as long as the ferrite particle contains a crystal phase component containing a perovskite crystal represented by the compositional formula: $RZrO_3$ (provided that R represents an alkaline earth metal element). However, from the viewpoint of obtaining a ferrite particle having a preferred resistance and magnetization as a core material for a carrier of a two-component electrophotographic developer, it is preferable that the ferrite particle contains a crystal phase component containing a spinel crystal represented by the compositional formula: $(MO)a(Fe_2O_3)b$ (provided that M represents at least one metal element selected from the group consisting of Fe, Mg, Mn, Cu, Zn, and Ni, $a+b=100$ (mol %)) as a main component.

Ferrite has crystal structures such as a spinel crystal structure, a magnetoplumbite crystal structure and a garnet crystal structure; and, a ferrite having a spinel crystal structure exhibits soft magnetism and is suitable as an electrophotographic developer carrier core material from the viewpoint that electrical characteristics such as resistance are also easily adjustable. Incidentally, the term main component means that when the ferrite contains a plurality of crystal phase components (including the crystal phase component containing a perovskite crystal represented by the compositional formula: $RZrO_3$ (provided that R represents an alkaline earth metal element)), the spinel crystal phase occupies the largest proportion among those crystal phase components, and particularly, the content of this spinel crystal phase component is preferably 50% by mass or more, more preferably 60% by mass or more, further more preferably 70% by mass or more, and even more preferably 80% by mass or more, and it is preferable that the ferrite particle is a spinel ferrite particle except for the perovskite crystal phase component and unavoidable impurities. The content of the spinel phase crystal phase component can be determined by the composition of metal elements and can be defined by the mass fraction obtainable when a phase composition analysis of the crystal phase constituting the ferrite particle is performed by a Rietveld analysis of an X-ray diffraction pattern, which will be described below.

In addition, it is even more preferable that the ferrite particle contains a crystal phase component containing a spinel crystal represented by the compositional formula: $(MnO)x(MgO)y(Fe_2O_3)z$ (provided that $15 \leq x \leq 50$, $2 \leq y \leq 35$, $45 \leq z \leq 60$, and $x+y+z=100$ (mol %)) as the main composition. By combining the above-mentioned composition with a conventional ferrite production method, a ferrite having 50% by mass or more of the spinel crystal phase component can be obtained. In the ferrite particle according to the present invention, the content proportion of the spinel crystal phase component is preferably 75% by mass or more, more preferably 85% by mass or more, further more preferably 95% by mass or more, even more preferably 96% by mass or more, and still more preferably 98% by mass or more.

By adopting a composition including Mn, the magnetization on a low magnetic field side can be increased. Furthermore, by adopting a composition including Mn, reoxidation of ferrite at the time of ejection from the furnace after sintering can be prevented. Particularly, by adjusting the content of Mn to 15 mol % or more, a relative increase in the content of Fe can be suppressed, and an increase in the content proportion of magnetite component in the ferrite particle can be suppressed. Therefore, decrease of magnetization on a low magnetic field side can be suppressed, and the occurrence of carrier adhesion can be suppressed. Furthermore, since it is easy to adjust the resistance value to a satisfactory value for performing electrophotographic printing, the occurrence of fogging, deterioration of gradation, and occurrence of image defects such as white spots can be suppressed. In addition, the toner consumption can be maintained appropriately. In the case where the content of Mn is adjusted to be 50 mol % or less, resistance becomes very high, and the occurrence of image defects such as white spots can be suppressed.

By adopting a composition including Mg, a ferrite particle having a high resistance can be obtained. Furthermore, by adjusting the content of Mg to 2 mol % or more, the content of Mn becomes appropriate with respect to the content of Fe, and it is easy to adjust the magnetization and resistance of the ferrite particle to be in a satisfactory range for performing electrophotographic printing. Therefore, the occurrence of fogging, deterioration of gradation, occurrence of brush streaks, and occurrence of image defects such as carrier scattering can be suppressed. In addition, in the case where magnesium hydroxide is used as an Mg raw material, when the sintering temperature at the time of producing the ferrite particle is low, hydroxyl groups may remain in the ferrite particle in some cases. By adjusting the content of Mg to 35 mol % or less, the amount of residual hydroxyl groups present due to the raw materials can be reduced. Therefore, the electrical characteristics of the amount of electric charge and resistance of the ferrite particle can be suppressed from fluctuating under the influence of ambient humidity due to the residual hydroxyl groups, and the environmental dependency of electrical characteristics of the ferrite particle can be further improved.

The ferrite particle is formed of a magnetic oxide containing ferric oxide as a main component. Therefore, it is a prerequisite that $x<z$ is satisfied. By adjusting the content of Fe to be 45 mol % or more and 60 mol % or less, it is easy to adjust the magnetization and resistance of the ferrite particle to be in a satisfactory range for performing electrophotographic printing.

1-3. Magnetic Characteristics

Next, magnetic characteristics of the ferrite particle will be described. In the case of using the ferrite particle as a core material of an electrophotographic developer carrier, the saturation magnetization obtainable by a VSM measurement when a magnetic field of 1 K·1000/4π·A/m is applied is preferably 50 emu/g or more and 65 emu/g or less. In the case where the saturation magnetization is 50 emu/g or more, the magnetic force of the core material is high, and carrier scattering caused by low magnetization can be satisfactorily suppressed. Furthermore, although saturation magnetization and electrical resistance are in a trade-off relationship, in the case where the saturation magnetization of the ferrite particle is in this range, a satisfactory balance is achieved between the two, and an electrophotographic developer that can satisfactorily perform electrophotographic printing with high image quality can be obtained. Furthermore, even if magnetization is high, when resistance is low, carrier scattering caused by low resistance may occur. By adjusting the saturation magnetization to 65 emu/g or less, carrier scattering caused by low resistance can be satisfactorily suppressed.

1-7. Physical Properties (1) Volume Average Particle Size ($D_{50}$)

In the case where the ferrite particle is used as a core material of an electrophotographic developer carrier, the volume average particle size ($D_{50}$) thereof is preferably 24 μm or more and 40 μm or less. Here, the volume average particle size as used herein refers to a value measured by a laser diffraction and scattering method in accordance with JIS Z 8825:2013. In the case where the volume average particle size is in this range, the charge-imparting property to a toner is high, and this charge-imparting property can be maintained over a long period of time. Therefore, lifetime prolongation of electrophotographic developers can be promoted.

In contrast, in the case where the volume average particle size ($D_{50}$) of the ferrite particle is less than 24 μm, since the particle size is small, carrier scattering is likely to occur. Furthermore, in the case where the volume average particle size ($D_{50}$) of the ferrite particle is less than 24 μm, since the particle size is small, the ferrite particles easily aggregate. In the case where the ferrite particle is used as a core material and the surface thereof is coated with a resin to obtain a carrier, when the ferrite particles are in an aggregated state, the surface of the individual ferrite particle cannot be coated satisfactorily with a resin. Subsequently, when the aggregates of the ferrite particles are loosened during production or during use of the developer, the developer has a higher content percentage of the carrier having large regions that are not coated with a resin. Therefore, in the case where a developer is produced by using a carrier that uses such a ferrite particle as a core material, a sufficient charge-imparting property to a toner may not be obtained, which is not preferable.

On the other hand, in the case where the volume average particle size ($D_{50}$) of the ferrite particle is more than 40 μm, the particle size of individual particle constituting the powder increases. Therefore, when compared with a ferrite particle having a small volume average particle size ($D_{50}$), the surface area of the carrier that contributes to frictional charging with a toner is small with respect to the whole powder. Therefore, a sufficient charge-imparting property to a toner may not be obtained. In order to improve this, when surface unevenness is given to individual ferrite particle to increase the surface area of the individual ferrite particle, the surface area of the carrier that contributes to frictional charging with a toner can be increased. In this case, the charge-imparting property to a toner is enhanced; however, cracking and chipping of the carrier are likely to occur as a mechanical stress is applied to the protruding parts on the carrier surface at the time of mixing with a toner and the like, and therefore, it is not preferable. That is, the strength of the carrier may not be maintained at the time of using the developer, which is not preferable.

(5) Shape Factor SF-1 (Degree of Circularity)

The value of the shape factor SF-1 determined for the ferrite particle on the basis of the following formula is preferably 100 or more and less than 120. As the value of the following formula is closer to 100, the shape of the ferrite particle is closer to a true spherical shape. In the case where the value of the shape factor SF-1 of the ferrite particle is in the above-described range, it is implied that the ferrite particle has an approximately spherical shape, and a cross-section thereof has an approximately circular shape.

$$SF\text{-}1=(R2/S)\times(\pi/4)\times100$$

provided that R: Feret's diameter (maximum), S: Area (projected area)

2. Electrophotographic Developer Carrier

Next, the electrophotographic developer carrier according to the present invention will be described. The electrophotographic developer carrier according to the present invention is characterized by containing the above-described ferrite particle and a resin coating layer provided on the surface of the ferrite particle. That is, it is characterized by using the ferrite particle as a core material of the electrophotographic developer carrier. Since the ferrite particle is as described above, the resin coating layer will be mainly described here.

(1) Type of Coating Resin

The type of the resin constituting the resin coating layer (coating resin) is not particularly limited. For example, a fluororesin, an acrylic resin, an epoxy resin, a polyamide resin, a polyamideimide resin, a polyester resin, an unsaturated polyester resin, a urea resin, a melamine resin, an alkyd resin, a phenol resin, a fluoroacrylic resin, an acrylic-styrene resin, a silicone resin, and the like can be used. Furthermore, modified silicone resins obtained by modifying a silicone resin and the like with various resins such as an acrylic resin, a polyester resin, an epoxy resin, a polyamide resin, a polyamideimide resin, an alkyd resin, a urethane resin, and a fluororesin, and the like may also be used. For example, from the viewpoint of suppressing resin detachment caused by a mechanical stress applied at the time of stirring and mixing with a toner, the coating resin is preferably a thermosetting resin. Examples of the thermosetting resin suitable as the coating resin include an epoxy resin, a phenol resin, a silicone resin, an unsaturated polyester resin, a urea resin, a melamine resin, an alkyd resin, and resins containing those. However, as described above, the type of the coating resin is not particularly limited, and an adequate coating resin can be appropriately selected depending on the type of the toner to be combined, the use environment, and the like.

Furthermore, the resin coating layer may be constructed by using one type of resin, or the resin coating layer may be constructed by using two or more kinds of resins. In the case of using two or more kinds of resins, the two or more kinds of resins may be mixed to form a single layer of the resin coating layer, or multiple layers of the resin coating layer may be formed. For example, it is also preferable to provide a first resin coating layer having satisfactory adhesiveness to the ferrite particle on the surface of the ferrite particle and provide, on the surface of the first resin coating layer, a second resin coating layer for imparting desired charge-imparting performance to the carrier, or the like.

(2) Resin Coating Amount

The amount of resin coating the surface of the ferrite particle (resin coating film amount) is preferably 0.1% by mass or more and 10% by mass or less with respect to the ferrite particle used as the core material. In the case where the resin coating amount is less than 0.1% by mass, it is difficult to sufficiently coat the surface of the ferrite particle with a resin, and it is difficult to obtain a desired charge-imparting ability. Furthermore, in the case where the resin coating amount is more than 10% by mass, aggregation between carrier particles occurs during the production, and not only a decrease in productivity such as a decrease in the product yield is caused, but also the developer characteristics such as fluidity of the developer in an actual device or the charge-imparting property to a toner vary, which is not preferable.

(3) Additives

The resin coating layer may contain an additive intended for controlling the electrical resistance, the amount of electric charge, and the charging rate of the carrier, such as a conductive agent and a charge control agent. Examples of the conductive agent include conductive carbons, oxides such as titanium oxide and tin oxide, and various organic conductive agents. However, since the electrical resistance of the conductive agent is low, in the case where the amount of addition of the conductive agent is too large, a charge leak is likely to occur. In particular, in the present ferrite particle, since the surface unevenness is controlled and the protruding parts are utilized as leak points when a resin coating layer is provided, in the case where a conductive agent is added, its addition amount can be lowered as compared with a conventional case. For example, the content of the conductive agent is preferably 0.1% by mass or more and 12.0% by mass or less, more preferably 0.1% by mass or more and 10.0% by mass or less, and even more preferably 0.1% by mass or more and 8.0% by mass or less, with respect to the solid content of the coating resin.

Examples of the charge control agent include various charge control agents and silane coupling agents that are generally used for toner. The types of these charge control agents and coupling agents are not particularly limited; and charge control agents such as a nigrosin dye, a quaternary ammonium salt, an organometallic complex, and a metal-containing monoazo dye; and an aminosilane coupling agent, a fluorinated silane coupling agent, and the like can be preferably used. The content of the charge control agent is preferably 0.25% by mass or more and 20.0% by mass or less, more preferably 0.5% by mass or more and 15.0% by mass or less, and even more preferably 1.0% by mass or more and 10.0% by mass or less, with respect to the solid content of the coating resin.

3. Electrophotographic Developer

Next, embodiments of the electrophotographic developer according to the present invention will be described. The electrophotographic developer includes the above-described electrophotographic developer carrier and a toner.

As the toner constituting the electrophotographic developer, for example, a polymerized toner produced by a polymerization method and a pulverized toner produced by a pulverization method can all be preferably used. These toners may include various additives, and any toner may be used as long as it can be used as an electrophotographic developer in combination with the above-described carrier.

The volume average particle size ($D_{50}$) of the toner is preferably 2 μm or more and 15 μm or less, and more preferably 3 μm or more and 10 μm or less. In the case where the volume average particle size ($D_{50}$) of the toner is in this range, an electrophotographic developer that can perform electrophotographic printing with high image quality can be obtained.

The mixing ratio of the carrier and the toner, that is, the toner concentration, is preferably 3% by mass or more and 15% by mass or less. An electrophotographic developer including the toner at this concentration allows a desired image density to be easily obtained and can suppress fogging or toner scattering more satisfactorily.

On the other hand, in the case of using the electrophotographic developer as a replenishment developer, the content of the toner is preferably 2 parts by mass or more and 50 parts by mass or less with respect to 1 part by mass of the carrier.

The electrophotographic developer can be suitably used for various electrophotographic developing apparatuses to which a magnetic brush developing method of subjecting a carrier to suction adhesion to a magnetic drum or the like by magnetic force to be a brush form to convey a toner, causing the toner to adhere to an electrostatic latent image formed on a photoreceptor or the like while applying a bias electric field, and forming a visible image, is applied. This electrophotographic developer can be used not only for an electrophotographic developing apparatus that uses a direct current bias electric field when a bias electric field is applied, but also for an electrophotographic developing apparatus that uses an alternating bias electric field in which an alternating current bias electric field is superposed on a direct current bias electric field.

4. Production Method

In the following description, methods for producing the ferrite powder, electrophotographic developer carrier core material, electrophotographic developer carrier, and electrophotographic developer according to the present invention will be described.

4-1. Ferrite Powder and Electrophotographic Developer Carrier Core Material

The ferrite powder and the electrophotographic developer carrier core material according to the present invention can be produced as follows.

First, appropriate amounts of raw materials are weighed so as to obtain a desired ferrite composition, subsequently pulverized and mixed with a ball mill, a vibrating mill or the like for 0.5 hours or more, and preferably 1 hour or more and 20 hours or less, and calcined.

For example, in order to produce a ferrite particle (spinel ferrite particle) containing a crystal phase component containing a spinel crystal represented by the compositional formula: $(MnO)x(MgO)y(Fe_2O_3)z$ (provided that $15 \leq x \leq 50$, $2 \leq y \leq 35$, $45 \leq z \leq 60$, $x+y+z=100$ (mol %)) as a main composition, the respective raw materials are weighed such that x, y, and z have desired values, and the raw materials are pulverized and mixed. As the raw materials, for example, $Fe_2O_3$, $Mg(OH)_2$ and/or $MgCO_3$, and at least one kind of manganese compound selected from the group consisting of $MnO_2$, $Mn_2O_3$, $Mn_3O_4$, and $MnCO_3$ are preferably used.

The ferrite particle according to the present invention contain a crystal phase component containing a perovskite crystal represented by the compositional formula: $RZrO_3$ (provided that R represents an alkaline earth metal element). Therefore, with regard to the alkaline earth metal element (R), an oxide of the alkaline earth metal element (R) is used as a raw material and weighed so as to obtain a desired amount of addition, and pulverized and mixed with other raw materials. With regard to Zr, $ZrO_2$ can be used as a raw material.

Here, in the case of producing a ferrite particle containing 0.05% by mass or more and 4.00% by mass or less of the crystal phase component containing a perovskite crystal (provided that as defined as the mass fraction obtainable when a phase composition analysis of the crystal phase constituting the ferrite particle is performed by a Rietveld analysis of an X-ray diffraction pattern), it is preferable to blend 0.1 or more and 3.0 or less of $ZrO_2$, and it is more preferable to blend 0.2 or more and 1.5 or less of $ZrO_2$, with respect to 100 of the main component raw materials as a molar ratio. Furthermore, it is preferable to blend 0.1 or more and 3.0 or less of an oxide of the alkaline earth metal element (R), and it is more preferable to blend 0.2 or more and 1.5 or less of $ZrO_2$, with respect to 100 of the main component raw materials as molar ratios. The crystal phase component containing a perovskite crystal is produced by a solid-phase reaction between an oxide of an alkaline earth metal element (R) and $ZrO_2$. Therefore, the production amount of the crystal phase component containing a perovskite crystal can be adjusted by appropriately changing the amounts of addition and the ratio of addition of the oxide of the alkaline earth metal element (R) and $ZrO_2$ within the preferred ranges of the blending amounts.

Furthermore, in the case of controlling the Rz of the ferrite particle in the range of the present invention, it is preferable to add the alkaline earth metal element and zirconium dioxide in a total amount in the range of 0.2 mol % or more and 1.5 mol % or less. In the case where the total amount of the alkaline earth metal element and zirconium is less than 0.2 mol %, the surface roughness Rz of the ferrite particle tends to be large, and the standard deviation Rzσ also tends to be large. On the other hand, in the case where the total amount of these elements is larger than 1.5 mol %, Rz tends to be small. Therefore, from the viewpoint that it is easy to control the surface roughness Rz in the range of the present invention, it is preferable to adjust the total amount in the above-mentioned range when these components are added.

When the ferrite particle according to the present invention is produced, $ZrO_2$ is weighed so as to obtain a desired amount of addition and is pulverized and mixed with other raw materials. In order to uniformly disperse zirconium dioxide inside the particle, it is desirable to add zirconium dioxide at the time of pulverizing and mixing of raw materials. Furthermore, it is also preferable that raw materials other than $ZrO_2$ are pulverized and mixed, and calcined in the atmosphere, subsequently $ZrO_2$ is added thereto, and the mixture is further pulverized and mixed. In that case, a pulverization product obtained by pulverizing and mixing the raw materials other than $ZrO_2$ is pelletized by using a pressure molding machine or the like, subsequently the product is calcined in the atmosphere at a temperature of 700° C. or higher and 1,200° C. or lower, and then $ZrO_2$ is added thereto.

After all the raw materials including $ZrO_2$ are pulverized and mixed, or after the raw materials other than $ZrO_2$ are pulverized and mixed and are calcined, a predetermined amount of $ZrO_2$ is added to the calcination product thus obtained, and then the mixture is further pulverized with a ball mill, a vibrating mill or the like, in either case, water is added to the pulverized mixture, followed by fine pulverization using a bead mill or the like, to thereby obtain slurry. The degree of pulverization can be controlled by adjusting the diameter of the beads used as a medium, the composition, and the pulverization time. In order to uniformly disperse the raw materials, beads which are fine particles having a particle size of 1 mm or less are preferably used as the medium. Furthermore, in order to uniformly disperse the raw materials, the raw materials are preferably pulverized such that the volume average particle size ($D_{50}$) of the pulverization product is 2.5 μm or less, and more preferably pulverized to be 2.0 μm or less.

In addition to this, in order to obtain the ferrite particle according to the present invention, it is desirable to use $ZrO_2$ having a BET specific surface area of 20 to 150 $m^2/g$ and a volume average particle size ($D_{50}$) of 0.5 μm to 2.5 μm as a raw material. By using a raw material having such characteristics, the growth of a crystal phase component containing a perovskite crystal can be caused to uniformly proceed while satisfactorily dispersing $ZrO_2$ in the particle. Segregation of the crystal phase component in the particle and abnormal grain growth of various crystal phase components can be suppressed, and the surface roughness Rz can be easily controlled to be in the range of the present invention. Therefore, cracking and chipping occurring at the interface of different crystal phases that do not solid-solubilize each other can be suppressed even when a mechanical stress is applied, and the strength of the ferrite particle can be enhanced. Furthermore, in order to suppress abnormal grain growth, it is preferable to perform pulverization such that the particle size ($D_{90}$) of the coarse side of the grain size distribution is 3.5 μm or less. By adjusting these, the crystal phase component containing a perovskite crystal can be dispersed more uniformly from the surface to the inner part of the particle.

Next, it is preferable that a dispersant, a binder and the like are added as necessary to the slurry thus obtained, and the viscosity of the slurry is adjusted to 2 poise or higher and 4 poise or lower. At this time, polyvinyl alcohol or polyvinylpyrrolidone can be used as the binder.

The slurry adjusted as described above is sprayed by using a spray dryer and dried to obtain a granulation product. At this time, regarding the granulation conditions, it is preferable to adjust the discharge amount to 20 Hz or more and 50 Hz or less, the speed of atomizer disc rotation to 11,000 rpm or more and 20,000 rpm or less, and the drying temperature to the range of 100° C. or higher and 500° C. or lower. For example, in order to obtain a ferrite particle having an apparent density in the above-described range, it is preferable to adjust the speed of atomizer disc rotation to 11,000 rpm or more and 16,000 rpm or less, and the drying temperature to 150° C. or higher and 300° C. or lower.

Next, the granulation product is classified before being sintered, to remove any fine particles included in the granulation product, from the viewpoint of obtaining a ferrite powder having a uniform grain size. Classification of the granulation product can be carried out by using an airflow classification, a sieve or the like, which are well-known.

Next, the classified granulation product is sintered. It is preferable that the granulation product is subjected to a preliminary sintering in a sintering furnace of a type in which a granulation product (object to be sintered) is allowed to pass through a hot part while flowing, such as a rotary kiln, and then to a sintering.

In the case where the preliminary sintering is performed in a sintering furnace of a type in which a granulation product is allowed to pass through a hot part while flowing, such as a rotary kiln, organic matter such as a binder used at the time of granulation can be removed from the granulation product in a relatively short period of time and uniformly, as compared with the case where the granulation product is placed in a saggar or the like and subjected to preliminary sintering in an immovable state. Simultaneously with this, ferrite reaction can be partially carried out during the preliminary sintering, and the occurrence of a fluctuation in the surface roughness Rz during subsequent sintering can be suppressed.

Furthermore, when the preliminary sintering is performed using a sintering furnace of the above-described type, it is preferable to set the temperature to, for example, 850° C. or higher and 1,050° C. or lower. In the case where the preliminary sintering is performed in this temperature range, abnormal grain growth can be suppressed while efficiently performing removal of organic matter and ferrite reaction, and it is easier to suppress the occurrence of a fluctuation in the surface roughness Rz as described above. Furthermore, in order to perform the removal of organic matter and ferrite reaction more efficiently, it is preferable to perform the preliminary sintering at a temperature higher than 850° C., and more preferably at a temperature of 900° C. or higher or higher than 900° C. Furthermore, in order to suppress abnormal grain growth, it is more preferable to perform the preliminary sintering at a temperature lower than 1,050° C., and more preferably at a temperature of 1,000° C. or lower or lower than 1,000° C., for example, 980° C. or lower.

Furthermore, in order to produce a ferrite particle that satisfies the Formula (2) and has low electric field dependency of resistance, the sintering is preferably performed by maintaining the granulation product in a weakly oxidizing atmosphere at a temperature of 850° C. or higher for 4 hours or longer and 24 hours or shorter. In addition, the sintering is preferably performed at a temperature higher than that in the preliminary sintering. However, the sintering temperature is not particularly limited as long as the ferrite particle according to the present invention can be obtained. Here, the weakly oxidizing atmosphere means that the oxygen concentration in a mixed gas atmosphere of nitrogen and oxygen is 0.1% by volume (1,000 ppm) or more and 5% by volume (50,000 ppm) or less, and the ambient oxygen concentration is more preferably 0.2% by volume (2,000 ppm) or more and 3.5% by volume (35,000 ppm) or less, and even more preferably 0.3% by volume (3,000 ppm) or more and 2.5% by volume (25,000 ppm) or less. In order to prevent re-oxidization of the particle surface after the sintering, it is preferable to perform cooling to a temperature of 300° C. or lower in the weakly oxidizing atmosphere.

For example, in order to produce a ferrite particle (spinel ferrite particle) containing a crystal phase component containing a spinel crystal represented by the compositional formula: $(MnO)_x(MgO)_y(Fe_2O_3)_z$ (provided that $15 \leq x \leq 50$, $2 \leq y \leq 35$, $45 \leq z \leq 60$, $x+y+z=100$ (mol %)) as a main composition in the present invention, it is more preferable to perform the sintering, in order to disperse a zirconium component at the grain boundaries while sufficiently growing ferrite crystal grains containing a spinel crystal, by maintaining the ferrite component for 5 hours or longer and shorter than 10 hours in a temperature range adequate for the generation of the ferrite component containing a spinel crystal (850° C. or higher and 1,150° C. or lower) before reaching the sintering temperature, and then, for example, maintaining for 1 hour or longer at a temperature adequate for generating a crystal phase component containing a perovskite crystal represented by the compositional formula: $RZrO_3$, such as strontium zirconate. By slowly sintering for a long period of time at a temperature adequate for generating a ferrite component containing a spinel crystal as a main component, the growth of crystal grains can be accelerated, and the surface roughness Rz can be made large. However, when the ferrite component is maintained for 5 hours or longer and shorter than 10 hours in a temperature range adequate for the generation of the ferrite component containing a spinel crystal (850° C. or higher and 1,150° C. or lower), the ferrite component may be maintained at a predetermined temperature (e.g., 1,000° C., 1100° C., etc.) in the range of 850° C. or higher and 1,150° C. or lower, or for example, the time for applying heat at 850° C. or higher and 1,150° C. or lower may be adjusted to be 5 hours or longer and shorter than 10 hours by adjusting the temperature increase rate under the temperature range to 60° C./hour or less. The point is, it is desirable to perform the sintering for 5 hours or longer and shorter than 10 hours in a sintering furnace at 850° C. or higher and 1,150° C. or lower. Subsequently, the ferrite particle according to the present invention can be obtained by maintaining for 1 hour or longer at a temperature adequate for generating a crystal phase component containing a perovskite crystal represented by the compositional formula: $RZrO_3$, such as strontium zirconate (sintering temperature).

For example, in the case of strontium zirconate ($SrZrO_3$), in order to adjust the apparent density to be in the range of the present invention while sufficiently generating a crystal phase component containing a perovskite crystal, it is preferable to set the sintering temperature to a temperature of preferably 1,170° C. or higher and 1,400° C. or lower, more preferably 1,180° C. or higher and 1,350° C. or lower, and even more preferably 1,200° C. or higher and 1,330° C. or lower, and to maintain the ferrite particle at such a sintering temperature for 1 hour or longer. In this case, the blending amount of zirconium oxide ($ZrO_2$) is preferably set to 0.2 mol to 3.00 mol.

Furthermore, for example, in the case of calcium zirconate ($CaZrO_3$) and barium zirconate ($BaZrO_3$), it is preferable that the raw material is finely pulverized, a reaction accelerator is added thereto, and the sintering is performed at a predetermined temperature or lower. In order to generate a crystal phase component containing a perovskite crystal of calcium zirconate ($CaZrO_3$) or barium zirconate ($BaZrO_3$), in the case where a reaction accelerator is not added, it is necessary to perform sintering at a high temperature of 2,000° C. or higher. On the other hand, by finely pulverizing the raw materials to have a primary particle size of about several dozen nanometers and adding an aluminum compound (e.g., alumina ($Al_2O_3$)) as a reaction accelerator, these crystal phase components containing a perovskite crystal can be generated even when the sintering temperature is a temperature of 1,500° C. or lower. As such, the ferrite particle according to the present invention can be obtained by maintaining at a temperature adequate for producing the crystal phase component containing a perovskite crystal depending on the intended composition, and also by adjusting other conditions as necessary.

Incidentally, at the time of performing the sintering, unlike in the preliminary sintering, it is preferably performed in a sintering furnace of a type in which a granulation product (object to be sintered) is placed in a saggar or the like and allowed to pass through a hot part in an immovable state, such as a tunnel kiln or an elevator kiln, rather than a sintering furnace of a type in which the granulation product is caused to pass through a hot part while flowing, such as a rotary kiln. In a sintering furnace of a type in which the granulation product is caused to pass through a hot part while flowing, such as a rotary kiln, in the case where the oxygen concentration in the sintering atmosphere is low, the granulation product may adhere to the inner surface of the furnace when passing through the hot part, and sufficient heat may not be applied to the granulation product that passes through the inner side of the furnace while flowing. In that case, since the granulation product passes through the hot part while the granulation product cannot be sufficiently sintered, even if sintering of the surface of the obtained sintered product is sufficiently carried out, internal sintering may be often insufficient. Since such a sintering product does not satisfy the strength required as an electrophotographic developer carrier core material, and also, the ferrite reaction in the inner part occurs insufficiently, the magnetic characteristics and electrical characteristics required as an electrophotographic developer carrier core material may not be satisfied. In addition, in the case where sintering at the inner part of the sintered product is insufficient, a crystal phase component containing a perovskite crystal represented by the compositional formula: $RZrO_3$ cannot be sufficiently produced in the sintering step. Therefore, it is difficult to obtain the ferrite particle according to the present invention.

On the other hand, in the case where the granulation product is sintered in a sintering furnace of a type in which the granulation product is placed in a saggar or the like and allowed to pass through a hot part in an immovable state, the inner part of the object to be sintered can be sufficiently sintered, and therefore, a ferrite particle which has a high magnetization and high resistance and in which a crystal phase component containing a perovskite crystal represented by the compositional formula: $RZrO_3$ has been sufficiently generated, can be easily obtained. From these reasons, when the sintering step is carried out, a tunnel kiln, an elevator kiln and the like are preferably used.

Subsequently, the sintered product is subjected to crushing and classification to obtain ferrite particles. Regarding the classification method, a wind force classification, a mesh filtration method, a sedimentation method, and the like, which are well-known, are used to adjust the grain size to a desired particle size. In the case of performing a dry collecting, the ferrite particles can also be collected by using a cyclone or the like. In the case of performing grain size adjustment, two or more kinds of the above-mentioned classification methods may be selected and performed, or coarse powder side particles and fine powder side particles may be removed by changing the conditions in one kind of classification method.

4-2. Electrophotographic Developer Carrier

The electrophotographic developer carrier according to the present invention uses the above-described ferrite particle as a core material and has a resin coating layer provided on the surface of the ferrite particle. The resin constituting the resin coating layer is as described above. When a resin coating layer is formed on the surface of the ferrite particle, any known method, for example, a brush coating method, a spray drying method using a fluidized bed, a rotary drying method, a liquid immersion drying method using a universal stirrer, or the like can be employed. In order to increase the proportion of the resin coated area with respect to the surface of the ferrite particle (resin coating ratio), a spray drying method using a fluidized bed is preferably employed. Regardless of which method is employed, the ferrite particle can be subjected to a resin coating treatment once or several times. The resin coating liquid used at the time of forming a resin coating layer may include the above-described additives. Furthermore, since the resin coating amount on the surface of the ferrite particle is as described above, the description will be omitted here.

After a resin coating liquid is applied on the surface of the ferrite particle, heating may be performed by an external heating method or an internal heating method, as necessary. For the external heating method, a fixed or fluid electric furnace, a rotary electric furnace, a burner furnace, or the like can be used. For the internal heating method, a microwave furnace can be used. In the case of using a UV-curable resin as the coating resin, a UV heater is used. Heating is required to be performed at a temperature equal to or higher than the melting point or the glass transition point of the coating resin. In the case of using a thermosetting resin, a condensation-crosslinking resin or the like as the coating resin, heating needs to be performed at a temperature at which curing of these resins proceeds sufficiently.

4-3. Electrophotographic Developer

Next, a method for producing the electrophotographic developer according to the invention will be described.

The electrophotographic developer according to the invention includes the above-described electrophotographic developer carrier and a toner. Regarding the toner, as described above, both a polymerized toner and a pulverized toner can be preferably used.

The polymerized toner can be produced by a known method such as a suspension polymerization method, an emulsion polymerization method, an emulsion aggregation method, an ester elongation polymerization method, or a phase inversion emulsification method. For example, a colored dispersion liquid in which a colorant is dispersed in water by using a surfactant is mixed and stirred with a polymerizable monomer, a surfactant and a polymerization initiator in an aqueous medium, the polymerizable monomer is emulsified and dispersed in the aqueous medium and is polymerized while stirring and mixing, and then a salting agent is added thereto to salt out polymer particles. The particles obtained by salting out are filtered, washed, and dried, whereby a polymerized toner can be obtained. Subsequently, an external additive may be added to the dried toner particles, as necessary.

In addition, when producing the polymerized toner particle, a toner composition including a polymerizable monomer, a surfactant, a polymerization initiator, a colorant, and the like is used. A fixability improving agent and a charge control agent can be blended into this toner composition.

Regarding the pulverized toner, for example, a binder resin, a colorant, a charge control agent, and the like are sufficiently mixed by using a mixing machine such as a Henschel mixer, subsequently melt-kneaded in a twin-screw extruder or the like to uniformly disperse, the resultant is cooled and then finely pulverized by using a jet mill or the like, the obtained product is classified, for example, classified by a wind force classifier or the like, whereby a toner having a desired particle size can be obtained. If necessary, a wax, a magnetic powder, a viscosity regulator, and other additives may be incorporated. Furthermore, after classification, an external additive can also be added.

Next, the present invention will be specifically described by presenting Examples and Comparative Examples. However, the present invention is not limited to the following Examples.

Example 1

(1) Ferrite Particle

In Example 1, a ferrite particle containing a crystal phase component containing a spinel crystal represented by the compositional formula: $(MnO)x(MgO)y(Fe_2O_3)z$ as a main component and containing a crystal phase component containing a perovskite crystal represented by the compositional formula: $SrZrO_3$ (R=Sr), was produced as follows. First, a MnO raw material, a MgO raw material and a $Fe_2O_3$ raw material were respectively weighed as main component raw materials, at molar ratios of MnO equivalent: 46.0, MgO equivalent: 3.0, and $Fe_2O_3$: 51.0. Furthermore, a SrO raw material was weighed SrO: 0.30 with respect to the main component raw materials: 100 in a molar ratio. Here, trimanganese tetroxide was used as the MnO raw material, magnesium oxide was used as the MgO raw material, ferric oxide was used as the $Fe_2O_3$ raw material, and strontium carbonate was used as the SrO raw material.

Next, the weighed raw materials were pulverized for 5 hours in a dry media mill (vibrating mill, stainless steel beads having a diameter of ⅛ inches), and the obtained pulverization product was pelletized into about 1 mm square by using a roller compactor. From the obtained pellets, coarse powder was removed by a vibrating sieve having a mesh size of 3 mm and fine powder was removed by a vibrating sieve having a mesh size of 0.5 mm, and then the remaining pellets were heated in a continuous electric furnace at 800° C. for 3 hours to perform calcination. Next, the pellets were pulverized by using a dry media mill (vibrating mill, stainless steel beads having a diameter of ⅛ inches) until the average particle size reached about 5 μm. At this time, the pulverization time was set to 6 hours.

To the obtained pulverization product, water and zirconium dioxide having a BET specific surface area of 30 m²/g and an average particle size of 2 μm as a $ZrO_2$ raw material were added, and the mixture was pulverized for 6 hours by using a wet media mill (transverse bead mill, zirconia beads having a diameter of 1 mm). At this time, zirconium dioxide was added to the pulverization product so as to be $ZrO_2$: 0.25 with respect to the main component raw materials: 100 in a molar ratio. When the particle size of the obtained slurry (primary particle size of the pulverization product) was measured with a laser diffraction grain size distribution analyzer (LA-950, Horiba, Ltd.), D50 was about 1.9 μm and $D_{90}$ was 3.4 μm.

In addition, an appropriate amount of a dispersant was added to the slurry prepared as described above, PVA (polyvinyl alcohol) as a binder was added at a proportion of 0.4% by mass with respect to the solid content (amount of calcination product in the slurry), and then the mixture was granulated and dried by a spray dryer. Grain size adjustment of the obtained granulation product was performed, subsequently the granulation product was heated by using a rotary electric furnace at 900° C. for 2 hours in an air atmosphere, to perform a preliminary sintering and remove organic components such as a dispersant and a binder.

Subsequently, sintering of the granulation product was performed by using a tunnel electric furnace, by maintaining the granulation product at a sintering temperature (retention temperature) of 1,215° C. in an atmosphere with an oxygen concentration of 1.2% by volume for 3 hours. At this time, the rate of temperature increase up to 850° C. was set to 100° C./hour, the rate of temperature increase from 850° C. to 1,215° C. as the sintering temperature was set to 50° C./hour, and the rate of cooling was set to 110° C./hour. The obtained sintered product was crushed by a hammer crusher and was classified by a gyro sifter (vibrating sieve machine) and a turbo classifier (air flow classifier) to perform grain size adjustment, and low magnetic force products were separated by magnetic ore dressing, to thereby obtain a ferrite particle. The principal production conditions for the ferrite particle of Example 1 are presented in Table 1.

(2) Electrophotographic Developer Carrier

The above-described ferrite particle was used as a core material, and the ferrite particle was coated with a silicone resin as follows to obtain a carrier of Example 1.

First, a silicone resin solution (resin solid content 10% by mass) was prepared by mixing a silicone resin (KR-350, manufactured by Shin-Etsu Chemical Co., Ltd.) and toluene. This resin solution and the ferrite particle of Example 1 were mixed by using a universal stirrer, to thereby coat the surface of the ferrite particle with the resin solution. At that time, the resin solution was used in such an amount that the resin solid content was 1.0% by mass with respect to the ferrite particle. Subsequently, the ferrite particle having the resin solution adhered thereto was heated under stirring at 250° C. for 3 hours by using a heat exchange stirring and heating apparatus, to volatilize volatile components included in the resin solution, to dry the ferrite particle. As a result, an electrophotographic developer carrier of Example 1 containing a resin coating layer on the surface of the ferrite particle was obtained.

(3) Electrophotographic Developer

The electrophotographic developer carrier and a toner were mixed by stirring for 30 minutes by using a TURBULA mixer, to obtain 50 g of a developer (toner concentration 7.5% by weight). Here, for the toner, a commercially available toner having negative polarity (cyan toner, for DocuPrint C3530, manufactured by Fuji Xerox; average particle size about 5.8 μm), which is used for full-color printers, was used.

Example 2

In the present Example, a ferrite particle of Example 2 was produced in the same manner as in Example 1, except that the $ZrO_2$ raw material was weighed so as to be $ZrO_2$: 0.75 and the SrO raw material was weighed so as to be SrO: 0.75 with respect to the main component raw materials: 100 in a molar ratio, the sintering temperature was set to 1,245° C., and the rate of temperature increase from 850° C. to 1,245° C. as the sintering temperature was set to 60° C./hour. The principal production conditions for Example 2 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 3

In the present Example, a ferrite particle of Example 3 was produced in the same manner as in Example 1, except that the $ZrO_2$ raw material was weighed so as to be $ZrO_2$: 0.15 and the SrO raw material was weighed so as to be SrO: 0.15 with respect to the main component raw materials: 100 in a molar ratio, the sintering temperature was set to 1,205° C., and the rate of temperature increase from 850° C. to 1,205° C. as the sintering temperature was set to 40° C./hour. The principal production conditions for Example 3 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 4

In the present Example, a ferrite particle of Example 4 was produced in the same manner as in Example 1, except that the ambient oxygen concentration during sintering was set to 0.7% by volume. The principal production conditions for Example 4 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 5

In the present Example, a ferrite particle of Example 5 was produced in the same manner as in Example 1, except that the ambient oxygen concentration during sintering was set to 1.8% by volume. The principal production conditions for Example 5 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 6

In the present Example, a ferrite particle of Example 6 was produced in the same manner as in Example 1, except that the ambient oxygen concentration during sintering was set to 0.4% by volume, the SrO raw material was weighed so as to be SrO: 0.15, and after obtaining a ferrite particle, the ferrite particle was subjected to a surface oxidizing treatment (provided that, hot part in an air atmosphere, 450° C.) by a rotary electric furnace equipped with a hot part and a cooling part subsequent to the hot part, followed by cooling, to perform a surface oxidizing treatment. The principal production conditions for Example 6 are presented in Table 1. Furthermore, an electrophotographic developer carrier was produced in the same manner as in Example 1, except that this ferrite particle was used as the core material, and an electrophotographic developer was produced by using this electrophotographic developer carrier.

COMPARATIVE EXAMPLES

Comparative Example 1

In the present Comparative Example, a ferrite particle of Comparative Example 1 was produced in the same manner as in Example 1, except that the $ZrO_2$ raw material was weighed so as to be $ZrO_2$: 0.90 and the SrO raw material was weighed so as to be SrO: 0.90 with respect to the main component raw materials: 100 in a molar ratio, the sintering temperature was set to 1,235° C., and the rate of temperature increase from 850° C. to 1,235° C. as the sintering temperature was set to 100° C./hour. The principal production conditions for Comparative Example 1 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 2

In the present Comparative Example, a ferrite particle of Comparative Example 2 was produced in the same manner as in Example 1, except that the $ZrO_2$ raw material was weighed so as to be $ZrO_2$: 0.15 and the SrO raw material was weighed so as to be SrO: 0.15 with respect to the main component raw materials: 100 in a molar ratio, the sintering temperature was set to 1,230° C., and the rate of temperature increase from 850° C. to 1,230° C. as the sintering temperature was set to 30° C./hour. The principal production conditions for Comparative Example 2 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 3

In the present Comparative Example, a ferrite particle of Comparative Example 3 was produced by producing a ferrite particle in the same manner as in Example 1, except that $ZrO_2$ was not weighed, the SrO raw material was weighed so as to be SrO: 0.05, the ambient oxygen concentration during sintering was set to 0% by volume, the sintering temperature was set to 1,180° C., and the rate of temperature increase from 850° C. to 1,180° C. as the sintering temperature was set to 100° C./hour, and then performing a surface oxidizing treatment in the same manner as in Example 6 (provided that the oxidizing treatment temperature in the hot part was 600° C.). The principal production conditions for Comparative Example 3 are presented in Table 1. Furthermore, an electrophotographic developer carrier was produced in the same manner as in Example 1, except that this ferrite particle was used as the core material, and an electrophotographic developer was produced by using this electrophotographic developer carrier.

<Evaluation>

For the ferrite particles of each Example and each Comparative Examples obtained as described above, (1) content of the perovskite crystal phase component, (2) dispersion degree of Zr element, (3) volume average particle size, (4) saturation magnetization, (5) electric characteristics, (6) SF-1, and (7) surface roughness Rz were measured. Furthermore, evaluations for (8) image density and (9) carrier scattering were performed by using the electrophotographic developers of each Example and each Comparative Example obtained as described above.

In the following description, the respective evaluation methods and measurement methods as well as evaluation results will be described.

1. Evaluation Methods and Measurement Methods (1) Content of Perovskite Crystal Phase Component (Mass %)

The ferrite particles produced in each Example and each Comparative Example were used as samples, and a powder X-ray diffraction pattern was subjected to a Rietveld analysis to determine the content of a perovskite crystal phase component represented by the compositional formula: $RZrO_3$ (provided that R represents an alkaline earth metal element) in each ferrite particle. In some cases, it may be difficult to perform identification and quantitative determination of each crystal phase by waveform separation of a powder X-ray diffraction pattern; however, identification and quantitative determination of each phase are enabled by a Rietveld analysis based on the crystal structure model.

As an X-ray diffraction apparatus, "X'Pert PRO MPD", manufactured by PANalytical B. V. was used. As an X-ray source, a Co tubular bulb (CoKα radiation) was used. As an optical system, a focused beam optical system and a high-speed detector "X'Celarator" were used. The measurement conditions are as follows.

Scan speed: 0.08°/sec
Divergence slit: 1.0°
Scattering slit: 1.0°
Light receiving slit: 0.15 mm
Voltage and current value of encapsulated tube: 40 kV/40 mA
Measurement range: 2θ=15° to 90°
Cumulative number: 5 times Based on the obtained measurement results, the crystal structure was identified as follows from the structures disclosed in "National Institute for Materials Science, "Atom-Work" (URL: http://crystdb.nims.go.jp/)".

Phase A: Crystal phase composed of manganese ferrite (spinel crystal)
Crystal structure: Space group Fd-3m (No. 227)

Phase B: Crystal phase composed of a perovskite crystal represented by compositional formula: $RZrO_3$
Crystal structure: Space group Pnma (No. 62)
Phase C: Zirconium dioxide (zirconia)
Crystal structure: Space group P-42m (No. 111)
Provided that in Space group Fd-3m attributing Phase A, Wyckoff positions of the respective atom were set as 8b for Mn atom, 16c for Fe atom, and 32e for O atom.

Next, the abundance ratio in terms of mass was calculated as the phase composition ratio of each crystal phase by refining the identified crystal structure by using the analysis software "RIETAN-FP v2.83 (http://fujioizumi.verse.jp/download/download.html)".

The profile function was subjected to asymmetricalization by Howard's method using the Thompson, Cox, and Hasting's pseudo-Voigt function. After it was confirmed that the Rwp value and S value representing the accuracy of fitting were Rwp: 2% or less and S value: 1.5 or less, respectively, and the main peaks of the phases B and C were fitted at 2θ=35° to 37°, optimization of various parameters was carried out.

Based on the results of the Rietveld analysis of the X-ray diffraction pattern carried out as described above, the content (mass %) of the crystal phase component containing a perovskite crystal (phase B) when the phase composition analysis of the crystal phases constituting the ferrite particle was carried out, was determined. In addition, the content (mass %) of the crystal phase component containing a spinel crystal (phase A) was also determined.

(2) Dispersion Degree of Zr Element

For the ferrite particles produced in each Example and each Comparative Example, the dispersion degree of Zr element defined by the following formula was measured.

Dispersion degree of $Zr=Zr(s)/Zr(c)$

Here, Zr(s): amount of Zr (mass %) at the surface part of a particle cross-section measured by energy dispersive X-ray analysis Zr(c): amount of Zr (mass %) at the central part of a particle cross-section measured by energy dispersive X-ray analysis Here, the procedure will be described with reference to FIGURE. The central part of a cross-section (particle cross-section) of a ferrite particle is defined as follows. When the maximum diameter in the particle cross-section (e.g., SEM image) is denoted by line segment Dx, the middle point of the line segment Dx is denoted by center C of the particle cross-section, and end points of the line segment Dx are respectively denoted by point P. Then, a square in which the center C is set as the center position, and the length of one side is 35% of the length of the line segment Dx, is designated as square S. A region surrounded by this square S is defined as the central part.

Furthermore, the surface part of the particle cross-section is defined as follows. A point on the line segment Dx, which is the position away from the point P toward the center C at a distance of 15% of the length of the line segment Dx, is denoted by point P'. Then, a rectangle in which a line segment that has a length of 35% of the length of the line segment Dx, orthogonally intersects the line segment Dx, and has the point P or the point P' as the middle point, constitutes a long side, and a line segment having a length of 15% of the length of the line segment Dx constitutes a short side, is designated as rectangle R1. In the present invention, a region surrounded by this rectangle R1 in the cross-section of a ferrite particle is defined as the surface part. Incidentally, FIGURE illustrates a cross-sectional shape of the ferrite particle 100 simplified to imitate a circle for explanation and does not illustrate the actual cross-sectional shape of the ferrite particle according to the present invention.

The central part and the surface part of the particle cross-section defined as such are subjected to energy dispersive X-ray analysis (EDX analysis), and the contents of Zr element for the respective regions are measured. The specific measurement method is as follows.

(a) A cross-section sample for measurement is produced by embedding ferrite particles in a resin and performing cross-sectional processing by ion milling. The ion milling is performed by using IM4000PLUS, manufactured by Hitachi High-Technologies Corporation in an argon atmosphere by setting the acceleration voltage of the ion beam to 6.0 kV. Here, as the ferrite single particle to be analyzed is selected a particle having a maximum diameter Dx in the range of $D_{50} \times 0.8 \leq Dx \leq D_{50} \times 1.2$ when the volume average particle size of the ferrite particle (powder) including the ferrite single particles is designated as $D_{50}$.

(b) For the obtained cross-section sample, the cross-section of the ferrite particle to be analyzed is observed by using a scanning electron microscope (SEM, SU8020, manufactured by Hitachi High-Technologies Corporation) by setting the acceleration voltage to 15 kV and WD to 15 mm. At this time, the magnification ratio is set such that only one ferrite particle to be analyzed exists in the visual field, and the entire particle is within the visual field.

(c) Then, an EDX analysis is performed for the central part and the surface part (regions defined as described above) of the ferrite particle cross-section. In the EDX analysis, mapping collection is performed for Fe, Mn, Mg, Sr, and Zr by using an energy dispersive X-ray analyzer (EMax X-Max50, manufactured by Horiba, Ltd.), and the amount of each element (mass %) is calculated from the X-ray spectrum peaks thus obtained. The amount of Zr at the central part of the particle cross-section thus obtained is designated as "Zr(c)", and the amount of Zr at the surface part of the particle cross-section is designated as "Zr(s)".

Then, the amount of Zr (Zr(c)) at the central part of the particle cross-section and the amount of Zr (Zr(s)) at the surface part of the particle cross-section obtained by an EDX analysis are substituted into the above-mentioned Formula (1), and thereby the dispersion degree of Zr in the ferrite particle to be analyzed can be obtained.

At this time, with regard to the amount of Zr at the surface part of the particle cross-section, four regions surrounded by rectangle R1, rectangle R2, which is defined similarly, and rectangle R3 and rectangle R4, which are defined based on points Q and Q' defined similarly to the points P and P' with respect to straight line Dy that is orthogonal to straight line Dx passing through the center C of the particle cross-section, are defined as the surface part, and the average value of the amounts of Zr in the respective regions was used. The respective rectangles R1, R2, R3, and R4 were disposed at an approximately equal interval along the contour of the particle cross-section.

Here, in the case where there is a plurality of line segments Dx, which are the maximum diameters, for one ferrite particle, a line segment Dy (line segment QQ') that is in a relationship showing a length of 0.5 or more with respect to the line segment Dx, will be referred to as Sx, Dy. As will be described below, the ferrite particle produced in each Example has an approximately grain shape (see SF-1 value). Therefore, in the case where the length of the line segment Dy (line segment QQ') is less than 0.5 with respect to the line segment Dx, it is highly probable that such a particle is a particle in which cracking, chipping or the like have occurred. Therefore, the single ferrite particle that is used as an object of analysis shall be a particle in which the length of the line segment Dy (line segment QQ') is 0.5 or more with respect to the line segment Dx.

(3) Volume Average Particle Size ($D_{50}$)

The volume average particle size ($D_{50}$) was measured as follows by using a MicroTrac grain size analyzer (Model 9320-X100), manufactured by NIKKISO CO., LTD., Ltd. The ferrite particles produced in each Example and each Comparative Example were used as samples, and a sample was prepared by introducing 10 g of each sample and 80 ml of water into a 100-ml beaker, adding two droplets or three droplets of a dispersant (sodium hexametaphosphate) thereto, and dispersing the mixture for 20 seconds by using an ultrasonic homogenizer (model UH-150, manufactured by SMT Co., LTD.) by setting the output power level to level 4 to remove any foam generated on the beaker surface. By using this sample, the volume average particle size of the sample was measured by the MicroTrac grain size analyzer.

(4) Saturation Magnetization

Saturation magnetization was measured by using a vibrating sample magnetometer (model: VSM-C7-10A (manufactured by Toei Industry Co., Ltd.)). The specific measurement procedure was as follows. First, the ferrite particles produced in each Example and each Comparative Example were used as samples, and a cell having an inner diameter of 5 mm and a height of 2 mm was filled with a sample and was mounted in the above-described apparatus. Then, a magnetic field was applied thereto and was swept up to 1 K·1000/4π·A/m (=1 kOe). Next, the applied magnetic field was reduced, and a hysteresis curve was produced on a recording paper. From the data of this curve, magnetization when the applied magnetic field was 1 K·1000/4π·A/m was read out and was designated as the saturation magnetization.

(5) Resistance

The ferrite particles produced in each Example and each Comparative Example were used as samples, and the resistance values $H_{1000}$ (Ω) and $H_{100}$ (Ω) in a high-temperature and high-humidity environment (30° C., relative humidity 80%) were measured by the following procedure. First, non-magnetic parallel flat plate electrodes (10 mm×40 mm) were disposed to face each other at a distance between electrodes of 2.0 mm, and the space therebetween was filled with 200 mg of a sample. The sample was maintained between the parallel flat plate electrodes by a magnet attached to the parallel flat plate electrodes (surface magnetic flux density: 1,500 Gauss, area of the magnet in contact with the electrodes: 10 mm×30 mm). Then, a predetermined voltage (1,000 V for $H_{1000}$ and 100 V for $H_{100}$) was applied between the parallel flat plate electrodes facing each other, and measurement was made by using an electrometer (manufactured by Keithley Instruments, LLC, insulation resistance meter model 16517A). The resistance value $H_{1000}$ and the resistance value $H_{100}$ are resistance values obtained by exposing a sample in a constant-temperature and constant-humidity chamber in which the ambient temperature and humidity have been adjusted to the high-temperature and high-humidity environment for 12 hours or longer by this method and then making measurement by the above-described procedure in this environment.

Furthermore, based on the logarithmic values of the resistance value $H_{1000}$ and the resistance value $H_{100}$ measured as such, the electric field variation ratio of resistance (log $H_{100}$/log $H_{1000}$) was determined. Table 1 shows the respective values.

(6) SF-1 (Degree of Circularity)

Sample liquids were prepared by using the ferrite particles produced in each Example and each Comparative Example, and by using each of the sample liquids, 3,000 particles in the sample liquid were observed by means of a particle size and shape distribution analyzer PITA-1, manufactured by Seishin Corporation. Next, the Area (projected area) and Feret's diameter (maximum) were determined by using the software ImageAnalysis accessory to the apparatus, and the value of the shape factor SF-1 was calculated for each and every particle according to the above-described formula. Then, the average value of the 3,000 particles used as the objects of observation was designated as the shape factor SF-1 of each ferrite particle.

Here, for the sample liquid, an aqueous solution of xanthan gum having a viscosity of 0.5 Pa·s was prepared as a dispersing medium, and a liquid obtained by dispersing 0.1 g of each ferrite particle in 30 cc of the aqueous solution of xanthan gum was used. By appropriately adjusting the viscosity of the dispersing medium as such, the state in which each ferrite particle is dispersed in the dispersing medium can be maintained, and measurement can be performed smoothly. In addition, the measurement conditions were set such that the magnification ratio of the object lens was set to 10 times, the filter was ND4×2, an aqueous solution of xanthan gum having a viscosity of 0.5 Pa·s was used for the preparation of the sample liquid, the quantity of flow thereof was set to 10 μl/sec in all cases, and the quantity of flow of the sample liquid was set to 0.08 μl/sec.

(7) Surface Roughness Rz

The ferrite particles produced in each Example and each Comparative Example were used as samples, and the surface roughness Rz was measured by the following procedure.

First, a three-dimensional shape of the surface of the particle to be measured was acquired by using Hybrid Laser Microscope mc2000, manufactured by Lasertec Corporation. As a pretreatment of the sample, a double-sided adhesive tape was attached on a glass slide, and the ferrite particles were sprinkled on the adhesive surface to fix the ferrite particle on the glass slide. A xenon lamp was used as a light source, the magnification ratio of the object lens was set to 100 times, a ferrite particle to be measured (particle to be measured) was selected, and the three-dimensional shape of its surface was acquired by an automated picturing with the software LMeye7 accessory to the apparatus.

On the three-dimensional image of the particle to be measured, acquired as above, 21 line segments each of 15.0 um were drawn with an interval of 0.75 um, and measured profile curves on each of the line segments were extracted. Correction by a profile curve filter was performed on each of the obtained measured profile curves to obtain a roughness curve. Then, the surface roughness Rz was calculated from the obtained roughness curve by using, as cut-off values of the profile curve filter, λs that divides a roughness component from a component with a shorter wavelength and λc that divides the roughness component from a waviness component, and setting the respective cut-off values as λs=0.0025 mm and λc=0.0800 mm. The average value of the values obtained in this manner for the 21 line segments was taken as Rz of the particle to be measured. Then, the same procedure was performed on 30 particles of the particle to be measured, and the average value of the roughness Rz values of the 30 particles to be measured was taken as the surface roughness Rz of the ferrite particle of each Example and each Comparative Example.

(8) Image Density

The image density was evaluated as follows by using the electrophotographic developers produced in each Example and each Comparative Example. For the image density, in a constant-temperature and constant-humidity chamber in which the ambient temperature and humidity had been adjusted to a low-temperature and low-humidity environment (10° C., relative humidity 20%), printing of 1,000 (1k) test images was performed under suitable exposure conditions by using a full-color electrophotographic developing machine (imagio MP C2500, manufactured by Ricoh Co., Ltd.), and then solid images were printed. Then, the image density of the solid images was measured by using a spectrophotometric densitometer ("Model 938", manufactured by X-Rite, Inc.) and was evaluated according to the following criteria.

Evaluation was performed, and the results were determined to be any one of A, B, and C by the following criteria.

"A": 1.2 or more
"B": 1.0 or more and less than 1.2
"C": Less than 1.0

(9) Quantity of Carrier Scattering

The quantity of carrier scattering was evaluated as follows, by using the electrophotographic developers produced in each Example and each Comparative Example. In a constant-temperature and constant-humidity chamber in which the ambient temperature and humidity had been adjusted to a high-temperature and high-humidity environment (30° C., relative humidity 80%), printing of 1000 (1k) test images was performed under suitable exposure conditions by using a full-color electrophotographic developing machine (imagio MP C2500, manufactured by Ricoh Co., Ltd.), subsequently three sheets of solid images were printed. Then, the sum of the quantities of carrier scattering in the solid images was counted by visual inspection and was determined to be any one of A, B, and C by the following criteria.

"A": 0 to 5
"B": 6 to 10
"C": 11 or more

2. Evaluation Results

Measurement results for each evaluation item described above are shown in Table 2. Here, in Table 2, the XRD analysis value represents the content (% by mass) of the perovskite crystal phase component obtained by a Rietveld analysis of a powder X-ray diffraction pattern. Furthermore, for the resistance value $H_{1000}$ and resistance value $H_{100}$, the respective logarithmic values thereof are shown.

(1) Content of Perovskite Crystal Phase Component and Dispersion Degree of Zr Element As shown in Table 2, with regard to the ferrite particles of Example 1 to Example 6, it was confirmed that a ferrite particle containing 0.22% by mass to 0.64% by mass of a perovskite crystal phase component represented by the compositional formula: $RZrO_3$ is obtained by using an oxide containing an alkaline earth metal element (R) and zirconium dioxide as raw materials. Furthermore, since the dispersion degrees of Zr in the ferrite particles of Example 1 to Example 6 had small values of 1.0 to 1.1, it was confirmed that the perovskite crystal phase component was satisfactorily dispersed in the ferrite particle. The ferrite particle of Example 3 in which the total amount of zirconium dioxide and the alkaline earth metal element (R) used as raw materials was small as compared with other Examples, had a small content of the perovskite crystal phase component as compared with other Examples. Furthermore, while the dispersion degree of Zr was 1.0 in other Examples, only the ferrite particle of Example 3 showed a slightly large value of the dispersion degree of Zr as 1.1. Example 2 and Example 3 could not be simply compared because the sintering conditions were different; however, it was confirmed that the content of the perovskite crystal phase component in the ferrite particle can be adjusted by controlling the total amount of zirconium dioxide and the alkaline earth metal element (R) used as the raw materials and the sintering conditions.

On the other hand, in the ferrite particle of Comparative Example 3 in which $ZrO_2$ was not added as a raw material, a ferrite particle containing a perovskite crystal phase component could not be obtained. In contrast, in Comparative Example 1 and Comparative Example 2 in which $ZrO_2$ and $SrO_2$ were used as raw materials to a level equivalent or higher than that in each Example, ferrite particles containing the perovskite crystal phase component were obtained.

Furthermore, it was confirmed that the ferrite particles of each Example and each Comparative Example had a content proportion of a spinel crystal phase component of 98% by mass or more, and that the ferrite particles were spinel ferrite particles.

(2) Surface roughness Rz

From Table 2, the ferrite particles of Example 1 to Example 6 had a surface roughness Rz of 2.1 µm or more and 4.3 µm or less. On the other hand, the ferrite particle of Comparative Example 1 had a small surface roughness Rz as 1.8 µm, the ferrite particle of Comparative Example 2 had a large surface roughness Rz as 4.7 µm, and both were out of the range defined in the present invention. The ferrite particle of Comparative Examples 1 and 2 contained the perovskite crystal phase component in the range defined in the present invention; however, the temperature increase rate in a temperature range of 850° C. or higher and 1,150° C. or lower was 100° C./hour or 30° C./hour for less than 5 hours or 10 hours or longer, and resulted in a too small surface roughness Rz or a too large surface roughness Rz were obtained. From this, it was confirmed that the surface roughness Rz can be adjusted by controlling the temperature increase rate in the temperature range of 850° C. or higher and 1,150° C. or lower.

(3) Others

The volume average particle size, saturation magnetization, and SF-1 of each Example and each Comparative Example are as shown in Table 2.

(4) Electrical characteristics

Next, the electrical characteristics of each ferrite particle will be described with reference to Table 2. For the ferrite particles of Example 1 to Example 6, it was confirmed that the logarithmic value log $H_{1000}$ of the resistance value $H_{1000}$ and the logarithmic value log $H_{100}$ of the resistance value $H_{100}$ were 6.6 to 7.9 and 7.1 to 8.2, respectively, and the ferrite particles had high resistance values in a high-temperature and high-humidity environment. Furthermore, the electric field dependency (log $H_{1000}$/log $H_{100}$) was in the range of 0.83 to 0.96, and it was considered that the electric field dependency is low and even in the case where the development electric field varies depending on the developing apparatus, the fluctuation of resistance is small. Furthermore, the ferrite particles of Comparative Example 1 and Comparative Example 2 had electric field dependency equivalent to that of Examples. On the other hand, for the ferrite particle of Comparative Example 3, the resistance value $H_{1000}$ could not be measured.

(5) Image Density and Amount of Carrier Scattering

From Table 3, in the case where carriers that used the ferrite particles of Example 1 to Example 6 as core materials were used, it was confirmed that an image density at a satisfactory level or a level without any problem in use can be maintained even in the low-temperature and low-humidity environment. Furthermore, in the case where carriers that used the ferrite particles of Example 1 to Example 6 as core materials were used, it was confirmed that carrier scattering can be sufficiently suppressed even in the high-temperature and high-humidity environment. Therefore, according to the ferrite particle of the present invention, by controlling the surface unevenness on the surface of the ferrite particle, when the ferrite particle is used as the core material and a resin coating layer is provided on the surface of the ferrite particle, the thickness of the resin coating layer becomes relatively thin at the protruding parts as compared with depressed parts. Since the ferrite particle according to the present invention has a high resistance value even in the high-humidity environment, by controlling the surface unevenness on the surface, portions having low resistance, which are attributed to the protruding parts of the ferrite particle, can be distributed approximately uniformly on the carrier surface while maintaining the overall surface resistance of the carrier high when the ferrite particle is produced into the carrier. As a result, particularly in a high-humidity environment, developability can be maintained by leaking the countercharge rapidly after development, while satisfactorily suppressing carrier scattering.

On the other hand, in the case where the ferrite particles of Comparative Example 1 to Comparative Example 3 were used, either or both of the image density and the amount of carrier scattering were rated as "C". Specifically, for example, the ferrite particle of Comparative Example 1 had a resistance value in the range of the present invention; however, the surface roughness Rz was small, and although carrier scattering was suppressed in the high-temperature and high-humidity environment, the image density in the low-temperature and low-humidity environment was decreased, so that satisfactory developability could not be obtained. In the ferrite particle of Comparative Example 2, the resistance value was in the range of the present invention; however, the surface roughness Rz was large, and although a satisfactory image density was obtained in the low-temperature and low-humidity environment, carrier scattering could not be suppressed in the high-temperature and high-humidity environment. The ferrite particle of Comparative Example 3 did not include a perovskite crystal phase; however, an effect of increasing the surface resistance was obtained by applying a surface oxidizing treatment. However, as described above, it was considered that on the surface of the ferrite particle, portions that were not sufficiently oxidized and exhibited a low resistance value, and portions in which oxidation of the surface proceeded and the resistance became too high, respectively existed locally. As a result, an effect of suppressing lowering of the image density and an effect of suppressing carrier scattering could not be obtained.

TABLE 1

|  |  | Blending amounts of main raw materials (molar ratio) | | | Blending amount with respect to main raw materials (molar ratio) | | | Temperature increase rate* | Sintering conditions | | Oxidation treatment |
|  |  |  | | | R* | | Total |  | Sintering | Oxygen |  |
|  |  |  | | | | Blending | amount |  | temperature | concentration |  |
|  |  | $Fe_2O_3$ | MnO | MgO | $ZrO_2$ | Type | amount | $(ZrO_2 + R)$ | (° C./hour) | (° C.) | (vol %) | (° C.) |
|---|---|---|---|---|---|---|---|---|---|---|---|---|
| Example | 1 | 51 | 46 | 3 | 0.25 | SrO | 0.3 | 0.55 | 50 | 1,215 | 1.2 | None |
|  | 2 | 51 | 46 | 3 | 0.75 | SrO | 0.75 | 1.5 | 60 | 1,245 | 1.2 | None |
|  | 3 | 51 | 46 | 3 | 0.15 | SrO | 0.15 | 0.3 | 40 | 1,205 | 1.2 | None |
|  | 4 | 51 | 46 | 3 | 0.25 | SrO | 0.3 | 0.55 | 50 | 1,215 | 0.7 | None |
|  | 5 | 51 | 46 | 3 | 0.25 | SrO | 0.3 | 0.55 | 50 | 1,215 | 1.8 | None |
|  | 6 | 51 | 46 | 3 | 0.25 | SrO | 0.3 | 0.55 | 50 | 1,215 | 0.4 | 450 |
| Comparative Example | 1 | 51 | 46 | 3 | 0.9 | SrO | 0.9 | 1.8 | 100 | 1,235 | 1.2 | None |
|  | 2 | 51 | 46 | 3 | 0.15 | SrO | 0.15 | 0.3 | 30 | 1,230 | 1.2 | None |
|  | 3 | 51 | 46 | 3 | 0 | SrO | 0.05 | 0.05 | 100 | 1,180 | 0 | 600 |

*R (alkaline earth metal element)

*Temperature increase rate (from 850° C. to the sintering temperature)

TABLE 2

|  |  | Spinel crystal phase component (mass %) | Perovskite crystal phase component (mass %) | Dispersion degree of Zr element | Volume average particle size $D_{50}$ (μm) | Saturation magnetization (emu/g) | logH100 (logΩ) | logH1000 (logΩ) | Electric field dependency * | SF-1 | Rz (μm) |
|---|---|---|---|---|---|---|---|---|---|---|---|
| Example | 1 | 98.32 | 0.23 | 1.0 | 32.7 | 57.8 | 7.8 | 7.3 | 0.94 | 106 | 2.8 |
|  | 2 | 96.55 | 0.64 | 1.0 | 32.6 | 56.9 | 7.9 | 7.3 | 0.92 | 103 | 2.1 |
|  | 3 | 98.43 | 0.13 | 1.1 | 32.6 | 58.6 | 7.4 | 7.0 | 0.95 | 108 | 4.3 |
|  | 4 | 98.47 | 0.24 | 1.0 | 32.8 | 60.1 | 7.1 | 6.5 | 0.92 | 107 | 2.7 |
|  | 5 | 98.56 | 0.24 | 1.0 | 32.1 | 56.3 | 8.2 | 7.9 | 0.96 | 107 | 2.8 |
|  | 6 | 98.34 | 0.22 | 1.0 | 32.3 | 57.2 | 8.0 | 6.6 | 0.83 | 106 | 2.5 |
| Comparative Example | 1 | 95.99 | 0.69 | 1.0 | 33.0 | 56.8 | 8.3 | 7.6 | 0.92 | 109 | 1.8 |
|  | 2 | 98.46 | 0.14 | 1.1 | 32.1 | 58.4 | 7.7 | 6.6 | 0.86 | 111 | 4.7 |
|  | 3 | 98.81 | 0.00 | — | 32.5 | 56.1 | 8.0 | B.D. | B.D. | 105 | 2.3 |

* Electric field dependency = logH1000/logH100

TABLE 3

|  |  | Image density | Carrier scattering |
|---|---|---|---|
| Example | 1 | A | A |
|  | 2 | B | A |
|  | 3 | A | B |
|  | 4 | A | B |
|  | 5 | B | A |
|  | 6 | A | B |
| Comparative Example | 1 | C | A |
|  | 2 | A | C |
|  | 3 | C | C |

INDUSTRIAL APPLICABILITY

According to the present invention, a ferrite particle that can suppress the occurrence of carrier scattering in a high-temperature and high-humidity environment and has satisfactory developability, an electrophotographic developer carrier core material, an electrophotographic developer carrier, and an electrophotographic developer can be provided.

The invention claimed is:

1. A ferrite particle,
comprising a crystal phase component comprising a perovskite crystal represented by the compositional formula: $RZrO_3$ (provided that R represents an alkaline earth metal element),
having a surface roughness Rz of 2.0 μm or more and 4.5 μm or less, and
satisfying the following formulas:

$6.5 \leq \log H_{1000} \leq 8.5$, and $0.80 \leq \log H_{1000}/\log H_{100} \leq 1.00$, where $\log H_{1000}$: logarithmic value ($\log(\Omega)$) of a resistance value $H_{1000}(\Omega)$ of the ferrite particle when an applied voltage of 1,000 V is applied at a distance between electrodes of 2 mm in a high-temperature and high-humidity environment (30° C., relative humidity 80%), and $\log H_{100}$: logarithmic value ($\log(\Omega)$) of a resistance value $H_{100}(\Omega)$ of the ferrite particle when an applied voltage of 100 V is applied at a distance between electrodes of 2 mm in the high-temperature and high-humidity environment (30° C., relative humidity 80%).

2. The ferrite particle according to claim 1, wherein the surface roughness Rz is 2.5 μm or more and 4.2 μm or less.

3. The ferrite particle according to claim 1, satisfying the following formulas:

$6.7 \leq \log H_{1000} \leq 8.2$, and $0.85 \leq \log H_{1000}/\log H_{100} \leq 1.00$.

4. The ferrite particle according to claim 1, wherein the R is at least one element selected from the group consisting of Sr, Ca, and Ba.

5. The ferrite particle according to claim 1, comprising the crystal phase component comprising the perovskite crystal in an amount of 0.05% by mass or more and 4.00% by mass or less when a phase composition analysis of a crystal phase constituting the ferrite particle is performed by a Rietveld analysis of an X-ray diffraction pattern.

6. The ferrite particle according to claim 1, wherein the ferrite particle is a spinel ferrite particle having a crystal phase component comprising a spinel crystal represented by the compositional formula: $(MnO)x(MgO)y(Fe_2O_3)z$ (provided that $15 \leq x \leq 50$, $2 \leq y \leq 35$, $45 \leq z \leq 60$, $x+y+z=100$ (mol %)) as a main composition.

7. An electrophotographic developer carrier core material, comprising the ferrite particle described in claim 1.

8. An electrophotographic developer carrier, comprising the ferrite particle described in claim 1 and a resin coating layer provided on a surface of the ferrite particle.

9. An electrophotographic developer, comprising the electrophotographic developer carrier described in claim 8 and a toner.

10. The electrophotographic developer according to claim 9, used as a replenishment developer.

* * * * *